United States Patent
Versteeg et al.

(10) Patent No.: US 10,951,263 B2
(45) Date of Patent: Mar. 16, 2021

(54) WIRELESS SYSTEM AND DEVICE COMMUNICATION MANAGEMENT

(71) Applicant: Charter Communications Operating, LLC, St. Louis, MO (US)

(72) Inventors: William C. Versteeg, Buford, GA (US); Umamaheswar A. Kakinada, Centennial, CO (US); Hossam H. Hmimy, Allen, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/260,877

(22) Filed: Jan. 29, 2019

(65) Prior Publication Data

US 2020/0244306 A1 Jul. 30, 2020

(51) Int. Cl.
| | | |
|---|---|---|
| H04B 1/7163 | (2011.01) | |
| H04B 1/7183 | (2011.01) | |
| H04W 52/60 | (2009.01) | |
| H04W 52/24 | (2009.01) | |
| H04B 1/7136 | (2011.01) | |

(52) U.S. Cl.
CPC ....... H04B 1/71632 (2013.01); H04B 1/7183 (2013.01); H04W 52/248 (2013.01); H04W 52/60 (2013.01); H04B 2001/71362 (2013.01)

(58) Field of Classification Search
CPC ... H04W 56/00; H04W 52/248; H04W 52/60; H04B 1/713; H04B 1/7143; H04B 1/71632; H04B 1/7183; H04B 2001/71362
See application file for complete search history.

(56) References Cited

U.S. PATENT DOCUMENTS

| | | | | |
|---|---|---|---|---|
| 8,472,499 B2* | 6/2013 | Bai | ...................... | H04B 1/7143 370/335 |
| 2002/0150147 A1* | 10/2002 | Liang | ................... | H04B 1/7143 375/133 |
| 2017/0026845 A1* | 1/2017 | Garg | ..................... | H04W 16/10 |
| 2017/0163391 A1* | 6/2017 | Kimura | ................. | H04W 16/14 |

* cited by examiner

*Primary Examiner* — Sung S Ahn
(74) *Attorney, Agent, or Firm* — Armis IP Law, LLC

(57) ABSTRACT

According to one configuration, a wireless communication system includes one or more wireless communication devices and gateway hardware. The gateway hardware can be configured to notify the one or more wireless communication devices of a change associated with frequency hopping settings (such as switchover from first frequency hopping settings to second frequency hopping settings). Further, the gateway hardware can include a first radio frequency interface and a second radio frequency interface. In accordance with the frequency hopping settings, the gateway hardware: i) fixedly tunes the first radio frequency interface to a first wireless channel; and ii) while the first radio frequency interface is fixedly tuned to the first wireless channel, the gateway hardware dynamically tunes the second radio frequency interface to hop amongst multiple different wireless channels. The frequency hopping settings support different wireless power levels depending on a number of pseudorandom wireless channels that are hopped.

34 Claims, 14 Drawing Sheets

| | TF1 | TF2 | TF3 | TF4 | TF5 | TF6 | TF7 | TF8 | TF9 | TF10 | TF11 | TF12 | TF13 | TF14 | TF15 | ⋮ |
|---|---|---|---|---|---|---|---|---|---|---|---|---|---|---|---|---|
| RFI #1 | CH #1 | CH #1 | CH #1 | CH #1 | CH #1 | CH #1 | CH #1 | CH #1 | CH #1 | CH #1 | CH #1 | CH #1 | CH #1 | CH #1 | CH #1 | ⋮ |
| RFI #2 | CH #2 | CH #2 | CH #2 | CH #2 | CH #2 | CH #2 | CH #2 | CH #2 | CH #2 | CH #2 | CH #2 | CH #2 | CH #2 | CH #2 | CH #2 | ⋮ |
| RFI #3 | CH #3 | CH #3 | CH #3 | CH #3 | CH #3 | CH #3 | CH #3 | CH #3 | CH #3 | CH #3 | CH #3 | CH #3 | CH #3 | CH #3 | CH #3 | ⋮ |
| RFI #4 | CH #4 | CH #4 | CH #4 | CH #4 | CH #4 | CH #4 | CH #4 | CH #4 | CH #4 | CH #4 | CH #4 | CH #4 | CH #4 | CH #4 | CH #4 | ⋮ |
| RFI #5 | CH #9 | | | | | | | | | CH #9 | | CH #8 | | | | |
| RFI #6 | | CH #16 | | CH #7 | | | | | CH #10 | | | | | | | |
| RFI #7 | | | | | | | CH #6 | CH #15 | | | CH #6 | | | | | |
| RFI #8 | | | | | CH #8 | | | | | | | | | CH #5 | | |

FREQUENCY HOPPING PATTERN 850

WIRELESS SYSTEM AND DEVICE COMMUNICATION MANAGEMENT

BACKGROUND

Conventional frequency-hopping is a method of transmitting radio signals by rapidly switching a carrier of a wireless device amongst many different frequency channels using a pseudorandom sequence known to both a transmitter and receiver. Typically, frequency hopping is used as a multiple access method in the Code Division Multiple Access (CDMA).

As a more specific example, to implement frequency hopping, each available frequency band is divided into sub-frequencies. Signals rapidly change (i.e., hop) among these frequencies in a predetermined order. In theory, interference at a specific frequency will only affect the signal during that short interval of use.

In certain instances, frequency hopping can cause interference with adjacent direct-sequence spread spectrum systems. However, it is generally a reliable method of communication and provides good use of a wireless spectrum.

BRIEF DESCRIPTION OF EMBODIMENTS

This disclosure includes the observation that there are deficiencies associated with conventional techniques of supporting wireless communications using frequency hopping. For example, certain wireless communication devices have limited range capability because they frequency hop on too few wireless channels. This is because a wireless station is limited as to a wireless power level at which it is able to transmit based on how many channels are hopped.

Embodiments herein include novel ways of providing improved wireless communications in a network environment.

More specifically, in accordance with first embodiments, a wireless communication system includes gateway hardware (such as executing corresponding software) and one or more wireless communication devices. During operation, the gateway hardware receives a command indicating to change an operational setting of a wireless communication device. The gateway hardware communicates an operational setting notification to the wireless communication device over a wireless communication link. In one embodiment, the operational setting notification modifies frequency hopping settings of the wireless communication device. In accordance with the modified frequency hopping settings, the gateway hardware and the wireless communication device communicate with each other via the modified frequency hopping settings.

In accordance with further embodiments, the operational setting notification modifies a number of channels over which the wireless communication device hops during communications with the gateway hardware.

In accordance with still further embodiments, the operational setting notification from the gateway hardware to the wireless communication device specifies a frequency hopping pattern in which the wireless communication device is to communicate with the gateway hardware. In one embodiment, the frequency hopping settings as specified by the operational setting notification enable the wireless communication device and the gateway hardware to communicate at a higher RF (Radio Frequency) power level.

Further embodiments herein include the gateway hardware communicating the operational setting notification to the wireless communication device in accordance with first frequency hopping settings implemented by the gateway hardware and the wireless communication device to communicate with each other. In one embodiment, the operational setting notification includes second frequency hopping settings (such as an enhanced channel map specifying more wireless channels on which to hop than the first frequency hopping settings). Subsequent to the communication of the operational setting notification to the wireless communication device, the gateway hardware receives wireless communications at the gateway hardware from the wireless communication device in accordance with the second frequency hopping settings instead of the first frequency hopping settings. In one embodiment, as mentioned, the second frequency hopping settings support frequency hopping amongst a greater number of wireless channels than the first frequency hopping settings.

In still further embodiments, the second frequency hopping settings as specified by the operational setting notification enable the wireless communication device and the gateway hardware to communicate at a higher RF (Radio Frequency) power level. For example, in one embodiment, when the number of wireless channels hopped increases above a threshold value, the gateway hardware and the wireless communication device switch over to transmitting wireless communications to each other at higher power levels. Thus, implementation of the modified frequency hopping settings by one or more wireless station (gateway hardware, wireless communication devices, etc.) increases a wireless range in which the one or more wireless stations are able to communicate.

Note further that the gateway hardware can be configured to communicate the operational setting notifications in any suitable manner. For example, in one embodiment, the gateway hardware transmits a respective operational setting notification in a data field of a beacon from the gateway hardware to the wireless communication device.

Additionally, or alternatively, in accordance with further embodiments, the gateway hardware transmits the operational setting notification via application layer provisioning (such as in the form of over-the-top data) through the gateway hardware to the wireless communication device.

Further embodiments herein include, at the gateway hardware, receiving a first portion of the communications from the wireless communication device over a first radio frequency interface tuned to a fixed wireless channel for one or more timeslots (timeframes); and receiving a second portion of the communications from the wireless communication device over a second radio frequency interface (or additional radio frequency interfaces) that are dynamically tuned over time to different wireless channels during each of one or more timeslots (timeframes).

In accordance with still further embodiments, the gateway hardware: i) receives a first portion of the communications from the wireless communication device in a first timeslot, the first portion being received over a first wireless channel as specified by the modified frequency hopping settings; and ii) receives a second portion of the communications from the wireless communication device in a second timeslot, the first timeslot spaced apart from the second timeslot in which no communications are by the wireless communication device, the second portion received over a second wireless channel as specified by the modified frequency hopping settings.

In one embodiment, as further discussed herein, the number of available wireless channels of the gateway hardware are effectively multiplied, based on performance needs, many times the number of actual physical radio frequency interfaces in the gateway hardware by way one or more of the following: (i) implementing different time slots; (ii) implementing different RF frequencies (channels) assigned to a same physical slot/radio frequency interface (hardware); (iii) all channels hop, at least a portion of which are set to a fixed frequency; (iv) wherein the gateway hardware and corresponding radio frequency interfaces support any number of wireless channels in different timeslots (e.g., number of hopped wireless channels is substantially greater than the number of available radio frequency interfaces); (v) wherein different channels and hopping patterns supported by the gateway hardware are used to support communications with different wireless communication devices in a network.

In accordance with second embodiments, in a similar manner as previously discussed, a wireless communication system includes gateway hardware and one or more wireless communication devices. The gateway hardware includes a first radio frequency interface and a second radio frequency interface. In accordance with received frequency hopping settings, the gateway hardware fixedly tunes the first radio frequency interface of the gateway hardware to a first wireless channel. While the first radio frequency interface is fixedly tuned to the first wireless channel, the gateway hardware dynamically tunes the second radio frequency interface to hop amongst multiple different wireless channels to receive communications from a remote wireless station.

In one embodiment, the gateway hardware provides fixed tuning of the first radio frequency interface to the first radio frequency interface to provide a higher level of quality of communications between the gateway hardware and one or more wireless communication devices. In other words, the fixed first radio frequency interface provides better level of quality (low bit rate error) of wireless communications than the dynamically tuned second radio frequency interface.

Further embodiments herein include, at the gateway hardware, in accordance with a frequency hopping pattern implemented by both the gateway hardware and a wireless communication device as specified by the frequency hopping settings, in different spaced apart timeframes, receiving communications from the wireless communication device over a combination of the first radio frequency interface fixedly tuned to the first wireless channel and the second radio frequency interface dynamically tuned to the different wireless channels.

In yet further embodiments, in accordance with a frequency hopping pattern implemented by both the gateway hardware and a wireless communication device, the gateway hardware transmits communications in different timeframes from a combination the first radio frequency interface fixedly tuned to the first wireless channel and the second radio frequency interface dynamically tuned to the different wireless channels. In one embodiment, as previously discussed, because it is fixedly tuned, as opposed to dynamically changing, the first radio frequency interface (tuned to transmit and receive over the fixed wireless channel) supports higher quality wireless communications with a wireless communication device than the second radio frequency interface.

Further embodiments herein include initiating frequency hopping using more than a threshold number of channels. For example, in one embodiment, the gateway hardware receives frequency hopping settings indicating to pseudo-randomly hop amongst more than the threshold number of (such as 50 or some other suitable value) different wireless channels including the first wireless channel and the second wireless channel. In one embodiment, the frequency hopping settings are generated such that each of the more than the threshold value number different channels is selected with equal probability.

In one embodiment, the frequency hopping settings received by the gateway hardware indicate to hop amongst a set of wireless channels, the set of wireless channels specified by the frequency hopping settings include: i) the first wireless channel to which the first radio frequency interface is fixedly tuned, ii) multiple wireless channels to which the second radio frequency interface is dynamically tuned, and iii) a group of one or more wireless channels to which the second radio frequency interface is not tuned.

In accordance with further embodiments, the gateway hardware includes a third radio frequency interface. The gateway hardware dynamically tunes a third radio frequency interface amongst the group of wireless channels.

In still further embodiments, the frequency hopping settings received from a communication management resource include first frequency hopping settings and second frequency hopping settings. In one embodiment, the first frequency hopping settings specify a first number of wireless channels in which to hop to communicate with a first wireless communication device; the second frequency hopping settings specify a second number of wireless channels in which to hop to communicate with a second wireless communication device. In one embodiment, the second number of wireless channels in the second frequency hopping settings is greater than the first number of wireless channels.

In accordance with further embodiments, the gateway hardware includes a third radio frequency interface and a fourth radio frequency interface. In accordance with the frequency hopping settings: the gateway hardware fixedly tunes the third radio frequency interface of the gateway hardware to a second wireless channel as specified by the frequency hopping settings. While the third radio frequency interface is fixedly tuned to the second wireless channel, the gateway hardware dynamically tunes the fourth radio frequency interface to hop amongst the multiple wireless channels.

Embodiments herein are useful over conventional techniques. For example, via fixedly tuning one or more radio frequency interfaces and dynamically tuning radio frequency interfaces, certain embodiments herein enables 8/16 channel gateway resources to support the additional channels (50+) in a backward compatible manner, which supports higher power (such as 27 dbm) as opposed to 8/16 channels at 17 dbm on the same hardware in a standards compliant manner. The ability to transmit at 27 dBm as opposed to 17 dBm with a same low cost 8/16 channel gateway (as opposed to 64 radio frequency interface gateway resource in which each radio frequency interface is fixedly tuned to a respective wireless channel) results in higher scalability and significant cost savings.

As described herein, the channel hopping as described herein the channel hopping on a gateway can be based on various combinations of the following techniques:

a) provide an indication of the hopping behavior of a local gateway to the device in the application layer payload and to the Gateway through a communication management resource—This is a fully backward compatible method with no protocol changes b) Use additional bits in a beacon from a gateway resource to indicate this change in settings (capability)—one or more new bits can be added to the beacon or currently existing bits in the beacon can be overloaded with additional meaning to indicate this capability.

c) Hybrid method, this method combines in a and b above to provide change in frequency hopping settings. This would require the wireless communication device to switch to a specified class B mode opportunistically to listen to corresponding beacons and get synced with the gateway resource.

d) Gateway can slide (dynamically tune) across additional frequencies in a hopping pattern, looking for a preamble from a currently communicating device (wireless communication device, gateway resource, etc. In one embodiment, embodiments herein include providing a channel mask to the end device that indicates support for certain spreading factors at the additional channel frequencies (wireless channels).

Additional possible implementation criteria:

Legacy devices without enhancements can be used to support different types of communications as described herein as it is a backward compatible enhancement framework.

Sectorization can be done in multiple ways weighing between reliability, coverage and efficiency (add a mathematical equation, function, etc., specifying different weightages and normalization settings).

Spreading Factor (SF) selection (SF 10 is a primary instantiation, but it can work), optimizations can be done based on the recent history interactions with devices and applications in use.

Selectively apply this technique to the gateways in a given deployment. Some of the techniques could include: hash the gateway address and hop frequencies based on optimization criteria (selected gateways, Apps, . . . )

Note that while on a given set of channels, up to 8 simultaneous packets can be received at the same time, one on each different wireless channel. This is useful when designing details of a respective hopping algorithm.

Note that any of the resources as discussed herein can include one or more computerized devices, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to support wireless communications according to embodiments herein. The instructions, when executed by the computer processor hardware, cause the computer processor hardware (such as one or more co-located or disparately processor devices or hardware) to: receiving a command indicating to change an operational setting of a wireless communication device in communication with a network through gateway hardware; from the gateway hardware, communicating an operational setting notification to the wireless communication device over a wireless communication link, the operational setting notification modifying frequency hopping settings of the wireless communication device and/or gateway resource; and receiving communications from the wireless communication device transmitted via the modified (such as new) frequency hopping settings communicated to the wireless communication devices.

Another embodiments herein includes a computer readable storage medium and/or system having instructions stored thereon to provide surveillance according to embodiments herein. The instructions, when executed by the computer processor hardware, cause the computer processor hardware (such as one or more co-located or disparately processor devices or hardware) to: receive frequency hopping settings at gateway hardware including a first radio frequency interface and a second radio frequency interface; in accordance with the frequency hopping settings: i) tune the first radio frequency interface of the gateway hardware to a first wireless channel; and ii) while the first radio frequency interface is fixedly tuned to the first wireless channel, dynamically tune the second radio frequency interface to hop amongst multiple different wireless channels.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of conveying wireless communications in wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 9 is an example diagram illustrating frequency hopping settings according to embodiments herein.

FIG. 11 is an example diagram illustrating multiple different frequency hopping patterns according to embodiments herein.

Figure 1:
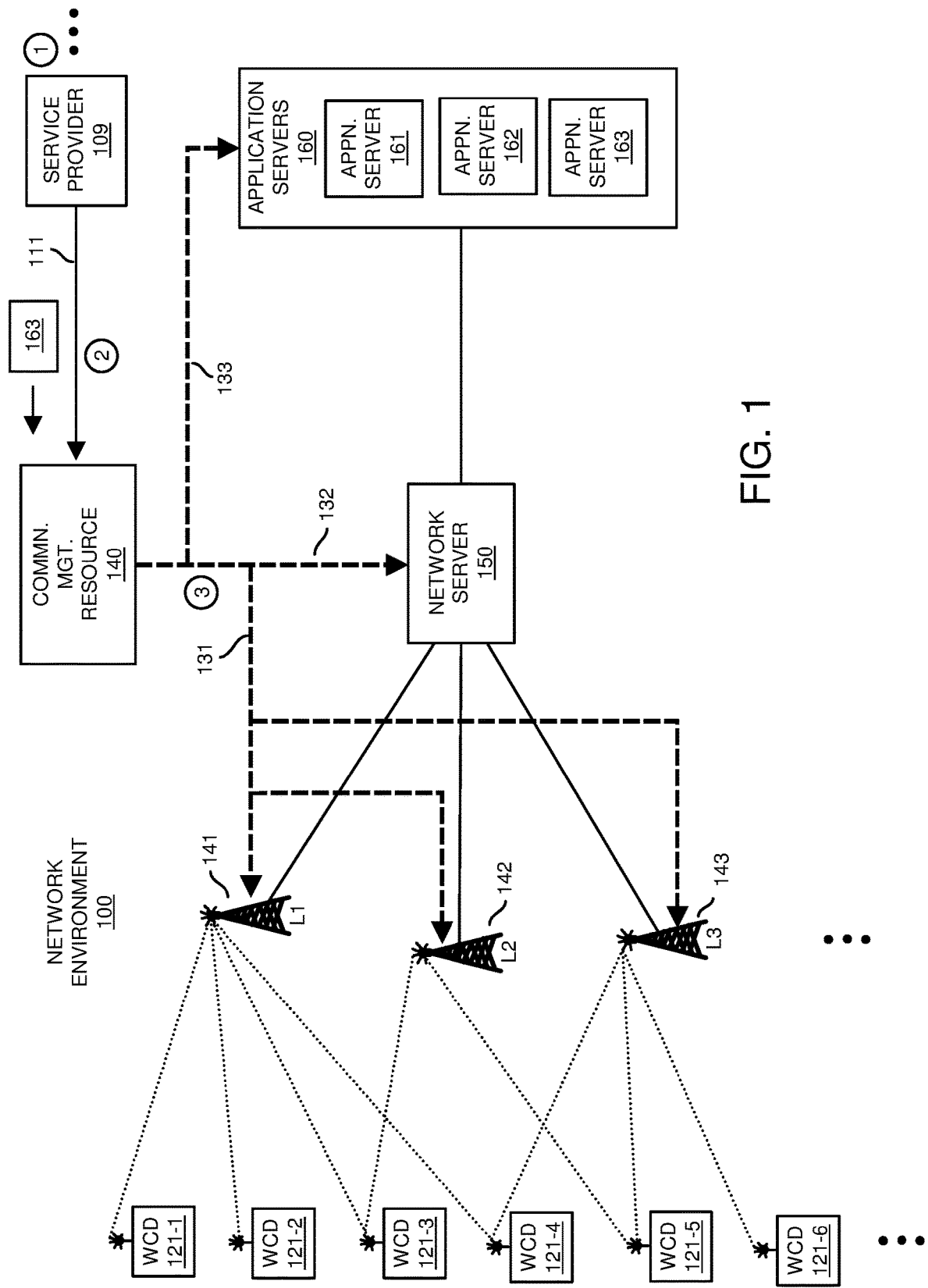
FIG. 1 is an example diagram illustrating a communication system supporting frequency hopping according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments herein, a wireless communication system includes one or more wireless communication devices and gateway hardware. The gateway hardware can be configured to notify the one or more wireless communication devices of a change associated with frequency hopping settings. In one embodiment, the gateway hardware communicates an operational setting notification to the wireless communication device over a wireless communication link, the operational setting notification modifying frequency hopping settings of the wireless communication device.

Subsequent to updating frequency hopping settings associated with the wireless communication device, the gateway hardware receives wireless communications from the wireless communication device transmitted via the modified frequency hopping settings.

Further, the gateway hardware according to embodiments herein can be configured to include a first radio frequency interface and a second radio frequency interface. In accordance with the frequency hopping settings, the gateway hardware: i) fixedly tunes the first radio frequency interface to a first wireless channel; and ii) while the first radio frequency interface is fixedly tuned to the first wireless channel, the gateway hardware dynamically tunes the second radio frequency interface to hop amongst multiple different wireless channels.

Original frequency hopping settings (such as less than 50 wireless channels) and new frequency hopping settings (such as based on more than 50 wireless channels) communicated to the gateway resource and the wireless communication device support different wireless power levels depending on a number of pseudorandom wireless channels that are hopped.

Now, more specifically, FIG. 1 is an example diagram illustrating a wireless communication system supporting frequency hopping according to embodiments herein.

As shown in this example embodiment, the network environment 100 includes multiple wireless communication devices 121-1, 121-2, 121-3, 121-4, 121-5, 121-6, etc., (collectively, wireless communication devices 121), multiple gateway resources 141, 142, and 143 (wireless stations), etc., network server 150, communication management resource 140, and one or more application servers 160.

Application servers 160 can include one or more applications servers such as application server 161, application server 162, application server 163, etc.

Note that each of the different components in network environment 100 can be implemented via hardware, software, or a combination of both hardware and software.

More specifically, each wireless communication device includes wireless communication hardware and or wireless communication software to carry out embodiments as discussed herein; each gateway resource includes gateway hardware and/or gateway software to carry out embodiments as discussed herein; network server 150 includes network server hardware and/or network server software to carry out embodiments as discussed herein; communication management resource 140 includes communication management hardware and/or communication management software to carry out any of the embodiments as discussed herein; each application server includes application server hardware and/or application server software to carry out any of the embodiments as discussed herein; and so on.

Note that each of the wireless communication devices 121 is disparately or collocated (located at the same location) in the network environment 100. Applications communicate commands to the wireless communication devices 121 in network environment 100 and receive data from respective wireless communication devices 121.

Further, as shown, gateway resource 141 is located at location L1 in network environment 100; gateway resource 142 is located at location L2 in network environment 100, gateway resource 143 is located at a location L3 in network environment 100; and so on. Each of the gateway resources supports communications with the same, different, overlapping sets of wireless communication devices.

Wireless communication devices 121 can be any suitable type of communication devices. In one embodiment, wireless communication devices are sensors such as those that: monitor location, monitor presence of smoke, monitor water consumption or flow, monitor trash containers, monitor gas and/or corresponding usage, etc.

Wireless communication devices can be configured to support any suitable type of environment and communicate any suitable type of data.

In general, each of the wireless communication devices 121-1 are in wireless communication with one or more respective gateway resources. In an upstream direction, the gateway resources communicate data received in communications from the wireless communication devices to the network server 150; network server 150 forwards the communications (such as over an IP connection 3G/Ethernet backhaul, etc.) upstream to one or more application servers 160.

Conversely, in a downstream direction, the application servers communicate data (such as commands, queries, etc.) through the network server 150 to one or more gateway resources. A respective one or more gateway resources forwards the communications to one or more appropriate wireless communication devices to which the communications are intended.

In one embodiment, the network environment 100 is implemented based on a Lora™ (long range communications with low power consumption), although the network environment 100 as described herein can be implemented in accordance with any suitable manner.

In accordance with further embodiments, each of the wireless links between wireless communication devices 121 and respective gateway resources (141, 142, 143, etc.) is implemented via frequency hopping.

For example, in one embodiment, each of the wireless communication devices and a respective gateway resource are configured with a same specific pseudorandom pattern of frequencies in which to communicate with each other over multiple different time frames.

In certain instances, if the amount of data to be transmitted is sufficiently small, a single data packet (such as transmitted from in the wireless communication device or the gateway resource) can be used to wirelessly convey appropriate data from a sender to a receiver in a single timeframe (such as single frequency).

Conversely, if the amount of data in a data packet is above a threshold value, the single larger sized data packet (such as transmitted from in the wireless communication device or the gateway resource) can be split into portions that are wirelessly conveyed from a sender to a receiver in multiple different timeframes (such as each portion of the data packet at a different hopping).

As further shown, and as further discussed herein, during operation, the service provider 109 generates a respective wireless communication policy 163 to be implemented by one or more components in the network environment 100.

Via communications 111, the service provider 109 communicates the wireless communication policy 163 to the communication management resource 140.

In one embodiment, in accordance with the wireless communication policy 163, the communication management resource 140 communicates control information (or other information) to the different components in network environment 100 that collectively implement the wireless communication policy 163.

More specifically, in accordance with the wireless communication policy 163, the communication management resource 140 identifies gateways and wireless channels that each of the gateways needs to support in order to provide a desired frequency hopping scheme (such as via 125 kHz wireless channels or wireless channels of any suitable bandwidth). In one embodiment, each of the gateway resources is time synced based on, for example, GPS/PTP, etc.

In this example embodiment, via communications 131, the communication management resource 140 notifies the gateway resources 141, 142, 143, etc., of the configuration information (wireless network settings associated with network environment 100) as specified by the policy 163.

Via communications 132, the communication management resource 140 notifies the network server 150 of the configuration information (wireless network settings associated with network environment 100) to be implemented.

Via communications 133, the communication management resource 140 notifies the application servers 160 of this configuration information (wireless network settings associated with network environment 100) to be implemented.

Accordingly, via communications 131, 132, and 133, the communication management resource 140 apprises the components in network environment 100 of any communication configuration implementation changes.

In one embodiment, the wireless communication devices and the gateway resources are able to communicate with each other at different transmit power levels depending on how many wireless channels of frequency hopping are implemented.

For example, in one embodiment, if the number of frequency hopping wireless channels implemented by the wireless communication devices/gateway resources is below a threshold value (such as 50 wireless channels), then the wireless communication devices and corresponding gateway resources are able to communicate with each other at a first maximum wireless power level (such as 17 dBm or other suitable value) in respective timeframes.

Alternatively, if the number of frequency hopping wireless channels implemented by the wireless communication devices/gateway resources is above a threshold value (such as 50 wireless channels), then the wireless communication devices and corresponding gateway resources are able to communicate with each other at a second maximum wireless power level (such as 27 dBm or other suitable value) in respective timeframes.

In one embodiment, each of the wireless communication devices transmit at a measured conducted power level no greater than +30 dBm, for a period of no more than 400 milliseconds and over at least 50 channels, each of which occupy no greater than 250 kHz of bandwidth.

In accordance with further embodiments, if desired, the system operates in a Digital Transmission System (DTS) mode, which requires that the wireless communication devices use channels greater than or equal to 500 kHz and comply to a conducted Power Spectral Density measurement of no more than +8 dBm per 3 kHz of spectrum. In practice, this limits the conducted output power of an end-device to +26 dBm.

In a so-called hybrid mode, which requires that the device transmit over multiple channels (this may be less than the 50 channels required for FHSS mode, but is recommended to be at least 4) while complying with the Power Spectral Density requirements of DTS mode and the 400 milliseconds dwell time of FHSS mode. In practice this limits the measured conducted power of the end wireless communication device to 21 dBm.

It may be noted that there are some subtle points how to measure the power (input to the antenna, or the output of the antenna). A directional antenna typically has −3 dB of gain in a given direction. So when a respective wireless communication specification calls for 17 dBm, the measured power at the output of the antenna can actually be 20 dBm. There are several parameters to consider when discussing FCC compliance in this area.

The TxParamSetup configuration is a world-wide enumerated type that sets the desired power level of the sensor. These enumerated values were defined by the LoRaWAN Alliance prior to customizing the standard for FCC compatibility. When a local regulation (ie FCC in the US and ETSI in the EU) has a more stringent requirement, the sensor is required to conform to the local regulation. In this case, a wireless station sending on 8 channels in the US would only send at 17 dBm when asked to send at 18 dBm.

In yet further embodiments, the wireless stations (gateway resource and wireless communication devices) are able to communicate in a predetermined number timeframes in a given duration of time.

As previously discussed, one embodiment herein includes generation, communication, and implementation of the wireless communication policy 163 to modify current wireless communication settings of network environment 100 and corresponding components such that the wireless communication link between the wireless communication devices 121 and the gateway resources 141, 142, 143, etc., support higher power wireless communications (such as over 50 or more 125 kHz wireless channels), increasing link quality (such as resulting in lower bit error rates).

Conversely, in certain instances, embodiments herein include generation, communication, and implementation of the wireless communication policy 163 to modify wireless communication settings of network environment 100 and corresponding components such that the wireless communication links between the wireless communication devices 121 and the gateway resources 141, 142, 143, etc., support fewer wireless channels than a prior frequency hopping settings implementation (freeing up wireless channels) and thus implementing lower power wireless communications between each other.

Figure 2:
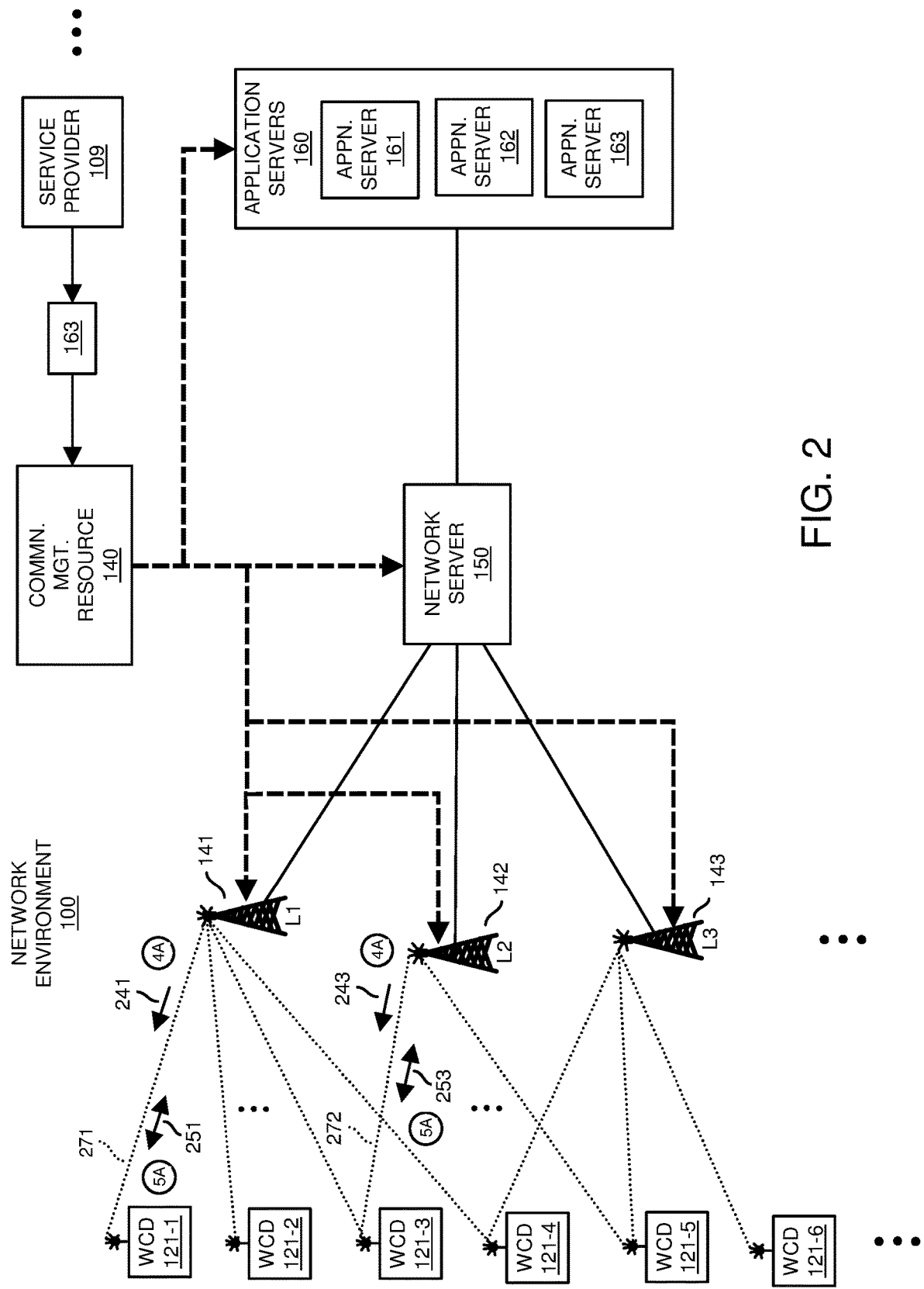
FIG. 2 is an example diagram illustrating configuration of a communication system supporting frequency hopping according to embodiments herein.

FIG. 2 is an example diagram illustrating configuration of a communication system supporting frequency hopping according to embodiments herein.

Further, in this example embodiment, via implementation of policy 163, the applications servers 160, network server 150, and the gateway resources 141, 142, 143, etc., are notified of the operational settings to implement for each gateway resource/wireless communication device.

Accordingly, each of the gateway resources gateway resources receives a command or other suitable communication (such as from communication management resource 140) indicating to change an operational setting of a wireless communication device in communication with a network through gateway hardware.

In this example embodiment, each of the gateway resources transmit a respective operational setting notification (change to frequency hopping settings) via application layer provisioning through a respective gateway resource to one or more target wireless communication devices.

More specifically, via communications 241, the gateway resource (hardware, software, and/or hybrid of hardware/software) communicates an operational setting notification (such as via the application layer provisioning) to the wireless communication device 121-1 over a wireless communication link 271. In one embodiment, the operational setting notification modifies frequency hopping settings of the wireless communication device 121-1. For example, in accordance with the modified frequency hopping settings communicated to the wireless communication device 121-1, the gateway resource receives communications 251 from the wireless communication device 121-1 as transmitted via the modified frequency hopping settings.

In a similar manner, the gateway resource 141 communicates frequency hopping settings information to each of the wireless communication device 121-2, 121-3, etc.

Additionally, in a similar manner, the gateway resource 142 communicates frequency hopping settings to respective one or more wireless communication devices 121-3, 121-4, etc. For example, in accordance with the modified frequency hopping settings communicated to the wireless communication device 121-3, the gateway resource 142 receives communications 252 from the wireless communication device 121-3 as transmitted via the modified frequency hopping settings as specified by the policy 163 implemented by the communication management resource 140.

Iterative Dynamic Channel Blocks

One embodiment herein includes hashing the EUI (Extended Unique Identifier value) of the gateway resource into an algorithm that allows the sensors (wireless communication devices 121) and respective gateway resource to rendezvous at a specific set of N (N typically==4) channels at a specific time offset during each day.

For instance the algorithm could be as follows

Decide how many channels that are to be covered (N=48, for instance)

Decide how many spare channels are available on a given gateway (M=4, for instance)

This yields 12 "dynamic channel blocks" i.e. (48/4)

Line the 12 channels up on a starting frequency, and split in accordance with monotonic blocks of 4.

Decide how often the system needs to hop. Let's use S==1 minute hops for this example. Notify the gateway resources and sensors (wireless communication devices) of frequency hopping settings in which to hop across 12 blocks of 4 channels every minute.

A deterministic pseudo-random algorithm is run on the EUI. The first channel block is that number mod 12.

After 1 minute, the algorithm is run on the result of the first iteration, and the gateway tunes to that block mod 12.

Iterate for the entire day, and then start over on the first minute of the next day If a sensor (wireless communication device) knows what time it is, and the EUI of a local gateway, it can send respective data to the gateway In one embodiment, a sensor (wireless communication device) can get the EUI of a local gateway and the current time by listening for a class B beacon prior to sending No changes required to the baseline LoRaWAN signaling, need to provision enhanced sensor (in application layer) and gateway with the algorithm specifics.

Additional details of implementing a respective one or more frequency hopping pattern is shown in FIGS. 8-11.

Figure 3:
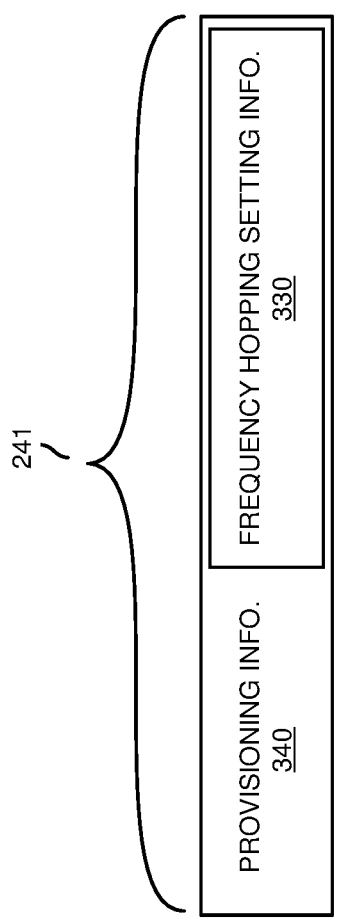
FIG. 3 is an example diagram illustrating frequency hopping control communications according to embodiments herein.

FIG. 3 is an example diagram illustrating frequency hopping control communications according to embodiments herein.

In this example embodiment, the one or more communications 241 from the gateway resource 141 to the wireless communication device 121-1 include provisioning information 340 generated by a respective application server 161 to cause the switchover to new frequency hopping settings as specified by the policy 163.

Note that the provisioning information 340 generated by the application server 161 includes the frequency hopping settings information 330 (such as one or more commands, frequency hopping patterns, frequency hopping algorithm to identify wireless channels over which to frequency hopping, etc.) to be implemented by the target wireless communication device 121-1.

Accordingly, the application layer provisioning by the application (such as via over-the-top communications from the application server to the wireless communication device 121-1) configures or re-configures (provisions) the wireless communication device 121-1 to support new frequency hopping settings.

Note that the operational setting notification communicated to the wireless communication device 121-1 can include any suitable information. For example, in one embodiment, the operational setting notification modifies a number of channels over which the wireless communication device 121-1 frequency hops during communications with the gateway resource 141.

In accordance with still further embodiments, as previously discussed, the operational setting notification (such as communications 241) from the gateway resource 141 to the wireless communication device 121-1 can be configured to specify a frequency hopping pattern (such as the frequency hopping pattern itself, algorithm to generate the frequency hopping pattern, etc.) in which to communicate with the gateway hardware.

In one embodiment, the frequency hopping settings information communicated from the gateway resource 141 to the wireless channel 121-1 as specified by the operational setting notification enables the wireless communication device 121-1 and the gateway resource 141 to communicate at a higher RF (Radio Frequency) power level than implementation of prior frequency hopping settings.

As a more specific example, assume that the wireless communication device 121-1 and the gateway resource 141 initially communicate via implementation of first frequency hopping settings. Via communications 241 over wireless communication link 271, the gateway resource 141 communicates second frequency hopping setting information to the wireless communication device 121-1. The frequency hopping settings information notifies the wireless communication device of new frequency hopping settings. Both the wireless communication device 121-1 and the gateway resource 141 then implement the second frequency hopping settings and support wireless communications 251 over the wireless communication link 271.

In one embodiment, the second frequency hopping settings support frequency hopping amongst a greater number of wireless channels (such as over 50 different wireless channels) than the first frequency hopping settings (such as less than 50 wireless channels).

The second frequency hopping settings as specified by the operational setting notification enable the wireless communication device 121-1 and the gateway resource 141 to communicate at a higher RF (Radio Frequency) power level. For example, when the number of wireless channels hopped increases above a threshold value (such as 50 wireless channels or other suitable value), the gateway resource 141 and the wireless communication device 121-1 switch over to transmitting at higher power wireless transmit levels to each other.

Referring again to FIG. 2, in a similar manner, in accordance with the generated policy 163, via provisioning, a respective application server can be configured to modify operation of any downstream wireless communication device. For example, via similar provisioning as previously discussed, the application server 162 can be configured to communicate provisioning information (frequency hopping settings information) through network server 150 and the gateway resource 142 to the 121-3.

As previously discussed, via implementation of the modified frequency hopping settings (such as expanding a number of frequency hopped wireless channels implemented over respective wireless links) by one or more wireless communication device and corresponding gateway resources 141, 142, 143, etc., increases a wireless range in which the one or more wireless communication devices are able to communicate.

Figure 4:
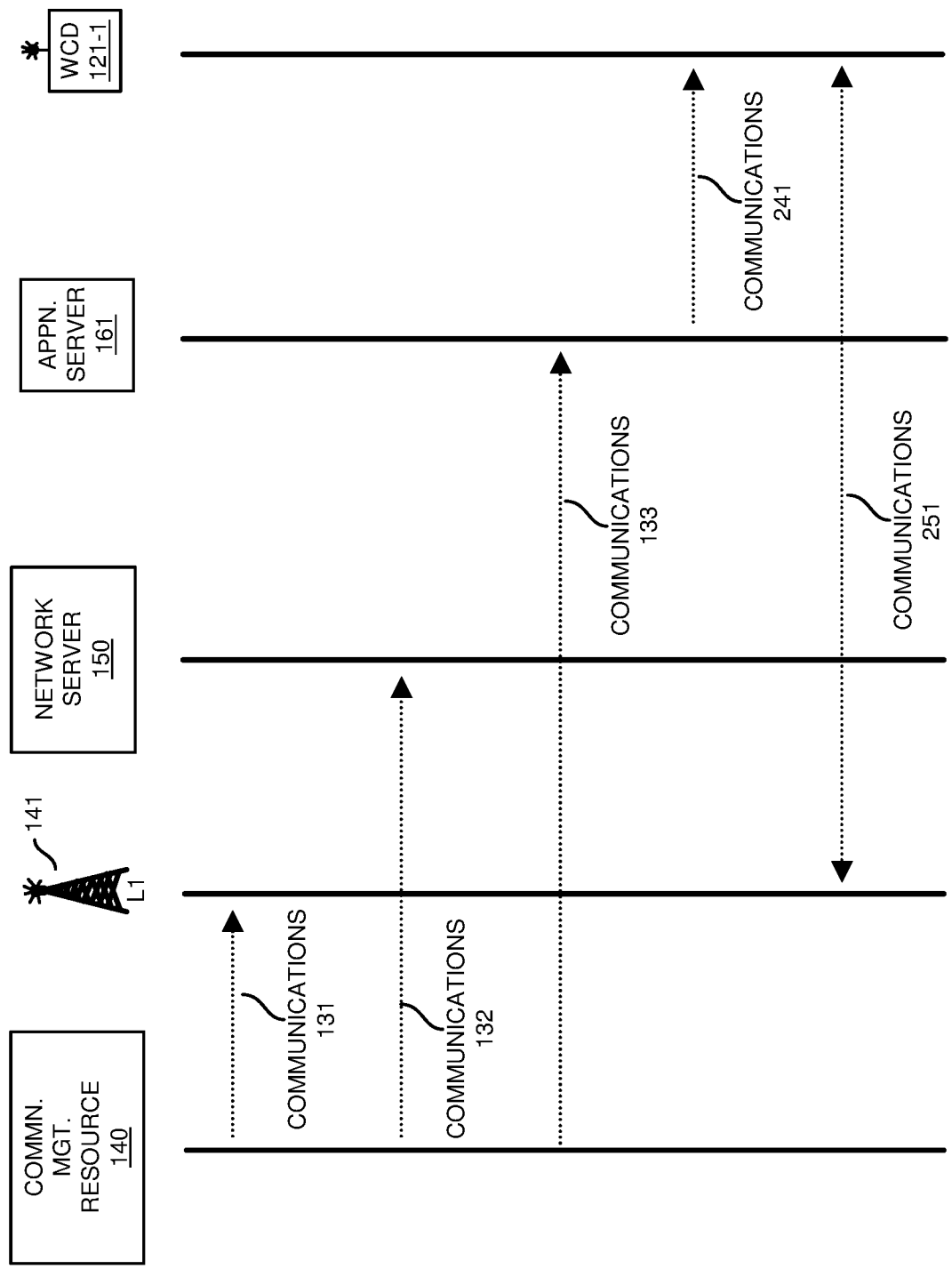
FIG. 4 is an example flow diagram illustrating communications associated with a wireless communication system according to embodiments herein.

FIG. 4 is an example diagram illustrating summarizing communications associated with a wireless communication system according to embodiments herein.

In this example embodiment, based on policy 163, the communication management resource 140 identifies one or more gateway resources and corresponding set of wireless channels on which each of the gateway resources and wireless communication devices is to frequency hop. In one embodiment, the gateway resources are time synchronized with GPS/PTP, etc.

Via communications 131, the communication management resource 140 notifies the gateway resources such as gateway resource 141 of the new frequency hopping settings.

Via communications 132, the communication management resource 140 notifies the network server 150 of the new frequency hopping settings.

Via communications 133, the communication management resource 140 notifies the one or more application servers 160 of the new frequency hopping settings.

Via communications 241 (and communications between applications servers and downstream wireless communication devices, the application servers communicate the new frequency hopping settings information over-the-top (such as data packets over the Internet) to the wireless communication device.

Via communications 251 (and other communications), the new policy 163 is in effect across all network functions. The wireless communication devices and the (enhanced) gateway resource 141 communicate with each other based on the new frequency hopping settings as specified by the policy 163.

Figure 5:
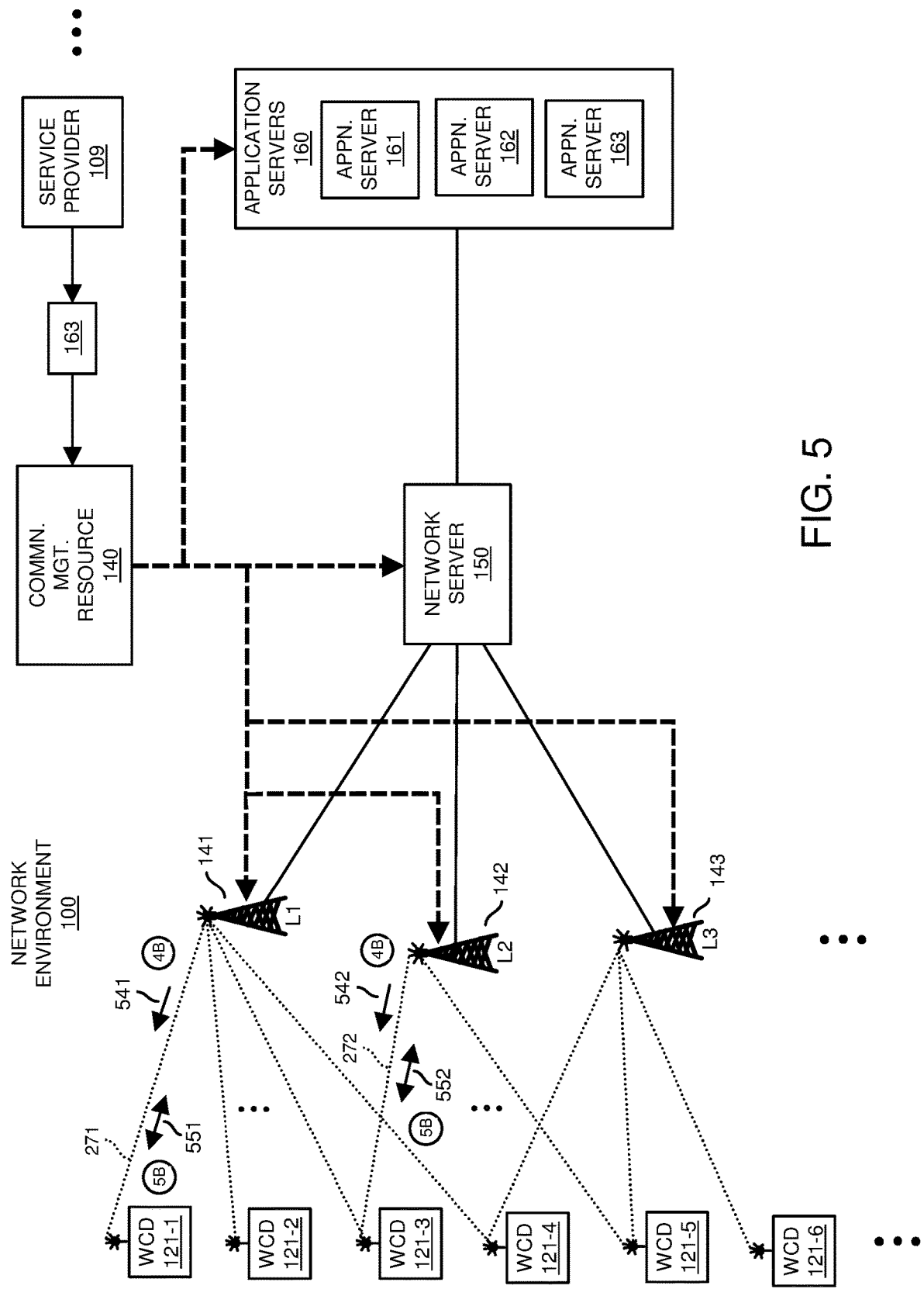
FIG. 5 is an example diagram illustrating configuration of a communication system supporting frequency hopping according to embodiments herein.

FIG. 5 is an example diagram illustrating configuration of a communication system supporting frequency hopping according to embodiments herein.

In one embodiment, as an alternative to provisioning the wireless communication devices in a manner as previously discussed, each respective gateway resource transmits the operational setting notification (such as new or updated frequency hopping settings information to be implemented) in one or more data fields of a beacon (such as a class B beacon or other suitable data communication) from a respective gateway resource 141 to the wireless communication device.

For example, via communications 541, the gateway resource 141 (hardware, software, and/or hybrid of hardware/software) communicates an operational setting notification (such as via information in a beacon) to the wireless communication device 121-1 via communications 541 over a wireless communication link 271. The operational setting notification in the communications 541 modifies frequency hopping settings of the wireless communication device 121-1.

For example, in accordance with the modified frequency hopping settings communicated to the wireless communication device 121-1, the gateway resource receives communications from the wireless communication device 121-1 as transmitted via the modified frequency hopping settings. Via communications 551, the gateway resource and the wireless communication device 121-1 communicate with each other via the new frequency hopping settings.

As further shown, via communications 542, the gateway resource 142 (hardware, software, and/or hybrid of hardware/software) communicates an operational setting notification (such as via information in a beacon) to the wireless communication device 121-3 via communications 542 over a wireless communication link 272. The operational setting notification in the communications 542 modifies frequency hopping settings of the wireless communication device 121-3.

For example, in accordance with the modified frequency hopping settings communicated to the wireless communication device 121-3, the gateway resource 142 receives communications from the wireless communication device 121-3 as transmitted via the modified frequency hopping settings. Via communications 552, the gateway resource 142 and the wireless communication device 121-3 communicate with each other via the new frequency hopping settings.

Figure 6:
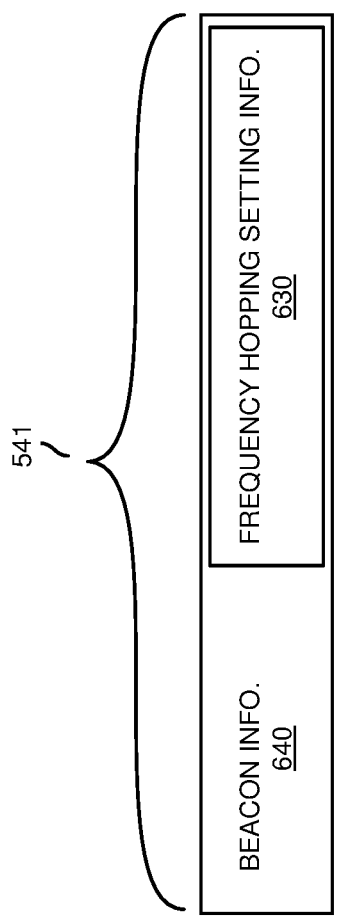
FIG. 6 is an example diagram illustrating frequency hopping control communications (such as via a beacon) according to embodiments herein.

FIG. 6 is an example diagram illustrating frequency hopping control communications according to embodiments herein.

In this example embodiment, the communications 541 from the gateway resource 141 include beacon information 640 generated by the gateway resource 141, causing the switchover to new frequency hopping settings as specified by the policy 163. Note that the beacon information 640 generated by the gateway resource 141 includes the frequency hopping settings information 630 (such as one or more commands, frequency hopping patterns, frequency hopping algorithm to identify wireless channels over which to frequency hopping, etc.) to be implemented by the target wireless communication device 121-1.

Accordingly, the frequency hopping settings information 630 in beacon information 640 associated with communications 541 from the gateway resource 141 to the wireless communication device 121-1 configures or re-configures (provisions) the wireless communication device 121-1 to support new frequency hopping settings as specified by the policy 163.

Note that the operational setting notification communicated to the wireless communication device 121-1 can include any suitable information. For example, in one embodiment, the operational setting notification modifies a number of channels over which the wireless communication device 121-1 frequency hops during communications with the gateway resource 141.

In accordance with still further embodiments, the operational setting notification (such as communications 541) from the gateway resource 141 to the wireless communication device 121-1 specifies a frequency hopping pattern (such as the frequency hopping pattern itself, algorithm to generate the frequency hopping pattern, etc.) in which to communicate with the gateway resource 141.

In one embodiment, the frequency hopping settings information communicated from the gateway resource 141 to the wireless communication device 121-1 as specified by the operational setting notification enables the wireless communication device 121-1 and the gateway resource 141 to communicate at a higher RF (Radio Frequency) power level than implementation of prior frequency hopping settings.

As a more specific example, assume that the wireless communication device 121-1 and the gateway resource 141 initially communicate via implementation of first frequency hopping settings. Via communications 541 over a respective wireless communication link to the wireless communication device 121-1, the gateway resource 141 communicates second frequency hopping setting information to the wireless communication device 121-1. Both the wireless communication device 121-1 and the gateway resource 141 then implement the second frequency hopping settings to support wireless communications 551 over the respective wireless communication link.

In one embodiment, the second (new) frequency hopping settings support frequency hopping amongst a greater number of wireless channels (such as over 50 different wireless channels) than the first (prior used) frequency hopping settings (such as less than 50 wireless channels). The second or new frequency hopping settings as specified by the operational setting notification enable the wireless communication device 121-1 and the gateway resource 141 to communicate at a higher RF (Radio Frequency) power level. For example, when the number of wireless channels hopped increases above a threshold value (such as 50 or other suitable value), and in accordance with the new frequency hopping settings, the gateway resource 141 and the wireless communication device 121-1 switch over to transmitting at higher power wireless transmit levels to each other.

Thus, in a more specific embodiment, a second variant of embodiments herein can include: publishing the extended channel map in a class B beacon (or other suitable communication) to one or more wireless communication devices. This could be a variant of the previous variant in which the gateway resource publishes (via notification to the wireless communication devices) values N, M, S in a wireless beacon message. The recipient wireless communication devices can be configured to perform any required calculations in real time. The communication can indicate a simple listing of "present enhanced map" and "next enhanced map", along with a respective roll-over time. In one embodiment, such as changeover is implemented via two bit maps of 16 bits each, and one or more data fields for the number of seconds until the respective roll over to the next frequency hopping map.

Figure 7:
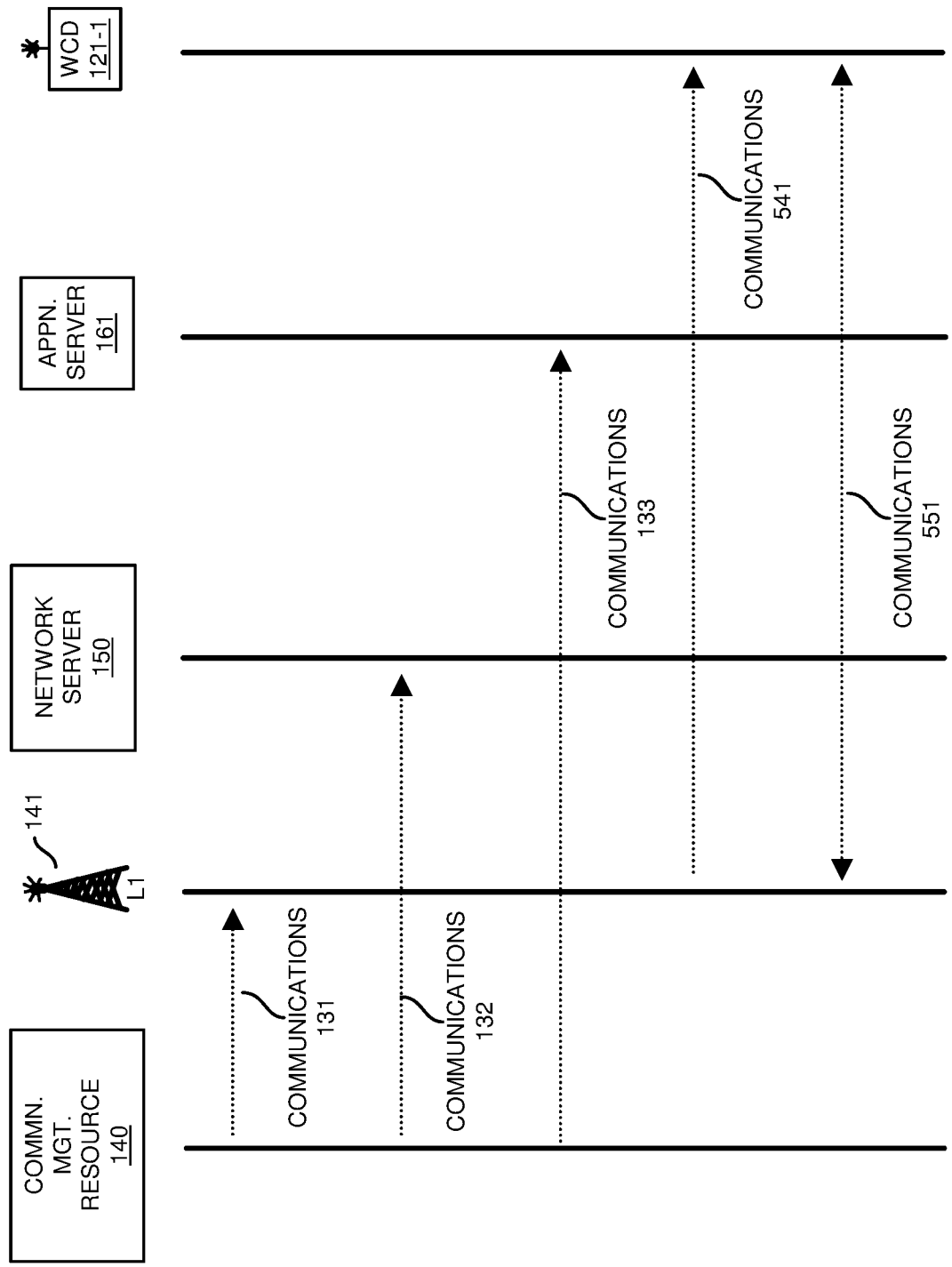
FIG. 7 is an example flow diagram illustrating communications associated with a wireless communication system according to embodiments herein.

FIG. 7 is an example diagram illustrating communications associated with a wireless communication system according to embodiments herein.

In this example embodiment, based on policy 163, the communication management resource 140 identifies one or more gateway resources and corresponding set of wireless channels on which each of the gateway resources is to frequency hop. In one embodiment, the gateway resources are time synchronized with GPS/PTP, etc.

Via communications 131, the communication management resource 140 notifies the gateway resources of the new frequency hopping settings.

Via communications 132, the communication management resource 140 notifies the network server 150 of the new frequency hopping settings.

Via communications 133, the communication management resource 140 notifies the one or more application servers 160 of the new frequency hopping settings.

Via communications 541 (and one or more beacons), each of the gateway resources 141 communicate the new frequency hopping settings information to the one or more wireless communication devices.

Via communications 551 (and other communications), the new policy 163 is in effect across all network functions. The wireless communication devices and the (enhanced) gateway resources 141 communicate with each other based on the new frequency hopping settings as specified by the newly implemented policy 163.

Figure 8:
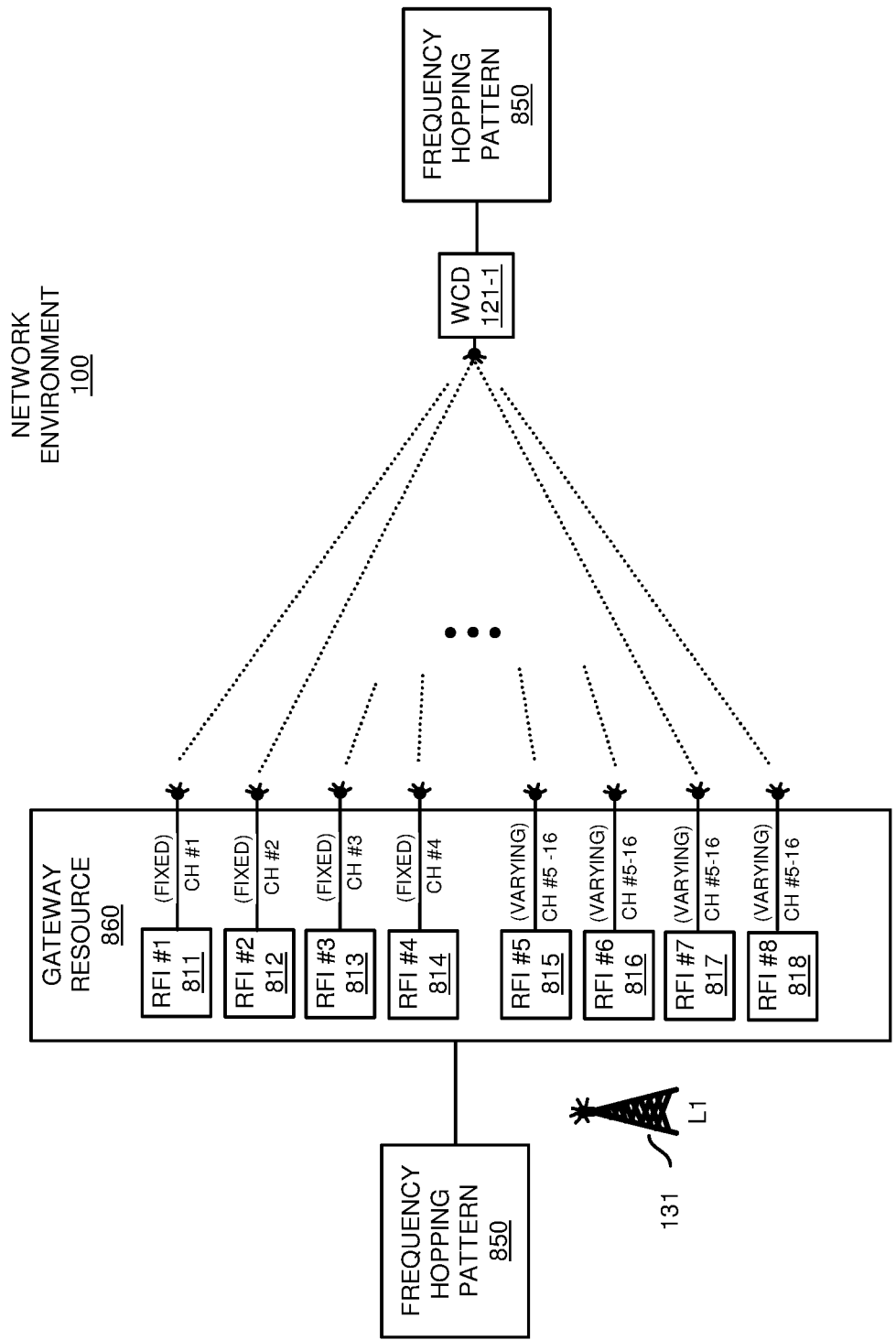
FIG. 8 is an example diagram illustrating a gateway resource supporting fixed and dynamic wireless channel tuning according to embodiments herein.

FIG. 8 is an example diagram illustrating a gateway resource supporting fixed and dynamic wireless channels according to embodiments herein.

As previously discussed, the gateway resource 141 implements a respective frequency hopping pattern as specified by the communication management resource 140 to communicate with the one or more wireless communication devices. The communication management resource 140 can change the number of wireless channels, frequency hopping settings, etc., at any time.

In this example embodiment, the gateway resource 141 includes multiple radio frequency interfaces to support communications with the one or more wireless communication devices.

To provide wireless communications, a first portion of the radio frequency interfaces of the gateway resource 141 are each tuned to a fixed wireless channel (frequency) to transmit and receive frequency hopped communications.

For example, radio frequency interface 811 is tuned to transmit and receive wireless communications over wireless channel #1; radio frequency interface 812 is tuned to transmit and receive wireless communications over wireless channel #2; radio frequency interface 813 is tuned to transmit and receive wireless communications over wireless channel #3; radio frequency interface 814 is tuned to transmit and receive wireless communications over wireless channel #4.

In this example embodiment, gateway resource 141 variably tunes the different radio frequency interfaces 815 through 818 amongst different wireless channels while each of the radio frequency interfaces 811-814 is tuned to a fixed wireless channel.

Because the gateway resource 860 and wireless communication devices support only frequency hopping on wireless channels #1-16 (such as less than a threshold value of 50 wireless channels), such devices (gateway resource and wireless communication devices) are limited to communicating at a first wireless transmit threshold value. As further discussed below, the gateway resource 141 is reconfigured to support frequency hopping amongst more than 50 wireless channels. In this latter instance, the gateway resource and the wireless communication devices are able to communicate up to a second wireless transmit threshold value, which is greater than the first threshold value.

As a further shown in example in FIG. 8, radio frequency interface 815 is variably (dynamically) tuned to transmit and receive wireless communications over wireless channels #5-16; radio frequency interface 812 is tuned to transmit and receive wireless communications over wireless channels #5-16; radio frequency interface 813 is tuned to transmit and receive wireless communications over wireless channels #5-16; radio frequency interface 814 is tuned to transmit and receive wireless communications over wireless channels #5-16.

Accordingly, via radio frequency interfaces 811 through 818 (total of eight radio frequency interfaces), the gateway resource 860 supports communications over wireless channels #1-16.

In one embodiment, in accordance with received frequency hopping settings, the gateway resource 860 fixedly tunes the radio frequency interface 811 of the gateway resource 141 to a first wireless channel #1. While the first radio frequency interface 811 is fixedly tuned to the first wireless channel #1, the gateway resource 141 dynamically tunes the radio frequency interfaces 815 through 818 to hop amongst multiple different wireless channels #5-16.

In accordance with a frequency hopping pattern implemented by both the gateway resource and a respective wireless communication device, the gateway resource transmits communications to the wireless communication device over at least a combination of the first radio frequency interface fixedly tuned to the first wireless channel and the second radio frequency interface dynamically tuned to the different wireless channels.

Thus, in one embodiment, when hopping amongst all of the wireless channels #1-16, the gateway resource 141 and wireless communication device communicate over a group of radio frequency interfaces 811-814 in which each of the radio frequency interfaces is set to a fixed wireless channel and a group of radio frequency interfaces 815 and 818 in which each of the radio frequency interfaces is dynamically tuned amongst different wireless channels.

In one embodiment, the benefit of fixedly tuning to the wireless channels #1-4 is that such channels provide higher quality communications to and from a respective target device. In other words, because the radio frequency interfaces 811 through 814 are fixedly tuned, as opposed to dynamically changing, they each typically support higher quality wireless communications with a wireless communication device than the radio frequency interfaces 815 through 818.

Note that tuning of extra radio frequency interfaces 815 through 818 can vary depending on the embodiment. For example, each of the radio frequency interfaces in gateway resource 141 can be configured to communicate over a corresponding assigned set of wireless channels that do not overlap with other wireless channels. For example, radio frequency interface 815 can be configured to dynamically tune amongst wireless channels #5-7; radio frequency interface 816 can be configured to dynamically tune amongst wireless channels #8-10; radio frequency interface 817 can be configured to dynamically tune amongst wireless channels #11-13; radio frequency interface 816 can be configured to dynamically tune amongst wireless channels #14-16.

FIG. 9 is an example diagram illustrating frequency hopping settings according to embodiments herein.

In this example embodiment, the gateway resource 141 implements frequency hopping pattern 850 to transmit wireless communications to wireless communication device 121-1 or receive wireless communications from wireless communication device 121-1.

The frequency hopping pattern 850 in FIG. 9 specifies settings for each of the different radio frequency interfaces in different timeframes. Note that the timeframe in the frequency hopping pattern 850 may be spaced apart timewise with respect to each other or follow one after the other without delays in between.

In one embodiment, there are relatively large windows of idle time between successive frequency hopped reception/ transmissions. This may be inherent in a corresponding wireless protocol implemented to support respective frequency hopped communications. The benefit of spacing apart communications in spaced apart timeframes can include any of one or more of the following: i) to comply with duty cycle requirements; to reduce processing needs, enhance battery life on devices, iii) minimize cost.

Note further that, in a manner as previously discussed, the gateway resource 141 can be configured to communicate with wireless communication device 121-2 in accordance with a different frequency hopping pattern using a portion of free radio frequency interfaces tuned to the fixed frequencies and a portion of the radio frequency interfaces that are dynamically tuned to different wireless channels.

More specifically, as further shown in FIG. 9, the gateway resource 141 transmits data in timeframe TF1 over radio frequency interface #5 dynamically tuned to wireless channel #9; the gateway resource 141 transmits data in timeframe TF2 over radio frequency interface #16 dynamically tuned to wireless channel #16; the gateway resource 141 transmits data in timeframe TF3 over radio frequency interface #2 fixedly tuned to wireless channel #2; the gateway resource 141 transmits data in timeframe TF4 over radio frequency interface #6 dynamically tuned to wireless channel #7; and so on.

In a similar pattern, the gateway resource can be configured to receive communications in multiple timeframes in accordance with the same or different frequency hopping pattern. For example, the gateway resource 141 can be configured to receive data from the wireless communication device 121-1 in timeframe TF1 over radio frequency interface #5 dynamically tuned to wireless channel #9; the gateway resource 141 can be configured to receive data from the wireless communication device 121-1 in timeframe TF2 over radio frequency interface #16 dynamically tuned to wireless channel #16; the gateway resource 141 can be configured to receive data from the wireless communication device 121-1 in timeframe TF3 over radio frequency interface #2 fixedly tuned to wireless channel #2; the gateway resource 141 can be configured to receive data in timeframe TF4 over radio frequency interface #6 dynamically tuned to wireless channel #7; and so on.

Further embodiments herein include, at the gateway resource 141, in accordance with a newly specified frequency hopping pattern (such as frequency hopping settings) implemented by both the gateway hardware 141 and a wireless communication device, receiving communications from the respective wireless communication device 121-1 over a combination of: i) one or more radio frequency interfaces of the gateway resource 141 fixedly tuned to the first wireless channel and ii) one or more radio frequency interfaces dynamically tuned to the different wireless channels.

Note that further embodiments herein further include (as a third variant), the gateway resource transparently "sliding" (dynamically tuning) the extra tuners across the enhanced channel map.

In one embodiment, in order to receive a packet, the gateway resource has to parse enough of the 8 symbol preamble to acquire the clock and lock onto the signal. In many environments, the gateway can acquire lock in less than 2 symbols. After every 2 symbol periods of time, the gateway resource slides (dynamically tunes) the radio frequency interfaces (tuners) over different possible wireless channels, covering as much of the spectrum as possible.

Yet further embodiments herein include providing a channel map with only a single spreading factor to the wireless communication devices. This makes dynamically finding the preamble much easier (at the expense of bandwidth and ADR). In one embodiment, the gateway resource dynamically tunes the radio frequency interfaces around 4 times per preamble. The gateway resource re-tunes a dynamic radio frequency interface every 2 symbol periods if no signal is detected.

In one embodiment, a gateway resource with 3 extra blocks of 4 (12 extra wireless channels) can cover 48 channels at a given spreading factor. When added to the fixedly tuned set of 4 radio frequency interfaces, this yields 52 possible wireless channels on which to transmit and/or receive wireless communications. This allows the wireless communication device (such as a sensor) to send at 27 dBm as previously discussed for a given timeframe.

Note that this algorithm can be tweaked to cover fewer or more channels using a given set of tuners, with a corresponding decrease/increase in the odds of receiving a given packet at a given time In accordance with further embodiments, all enhancements are self-contained in the gateway resource—no protocol and device changes are needed.

Figure 10:
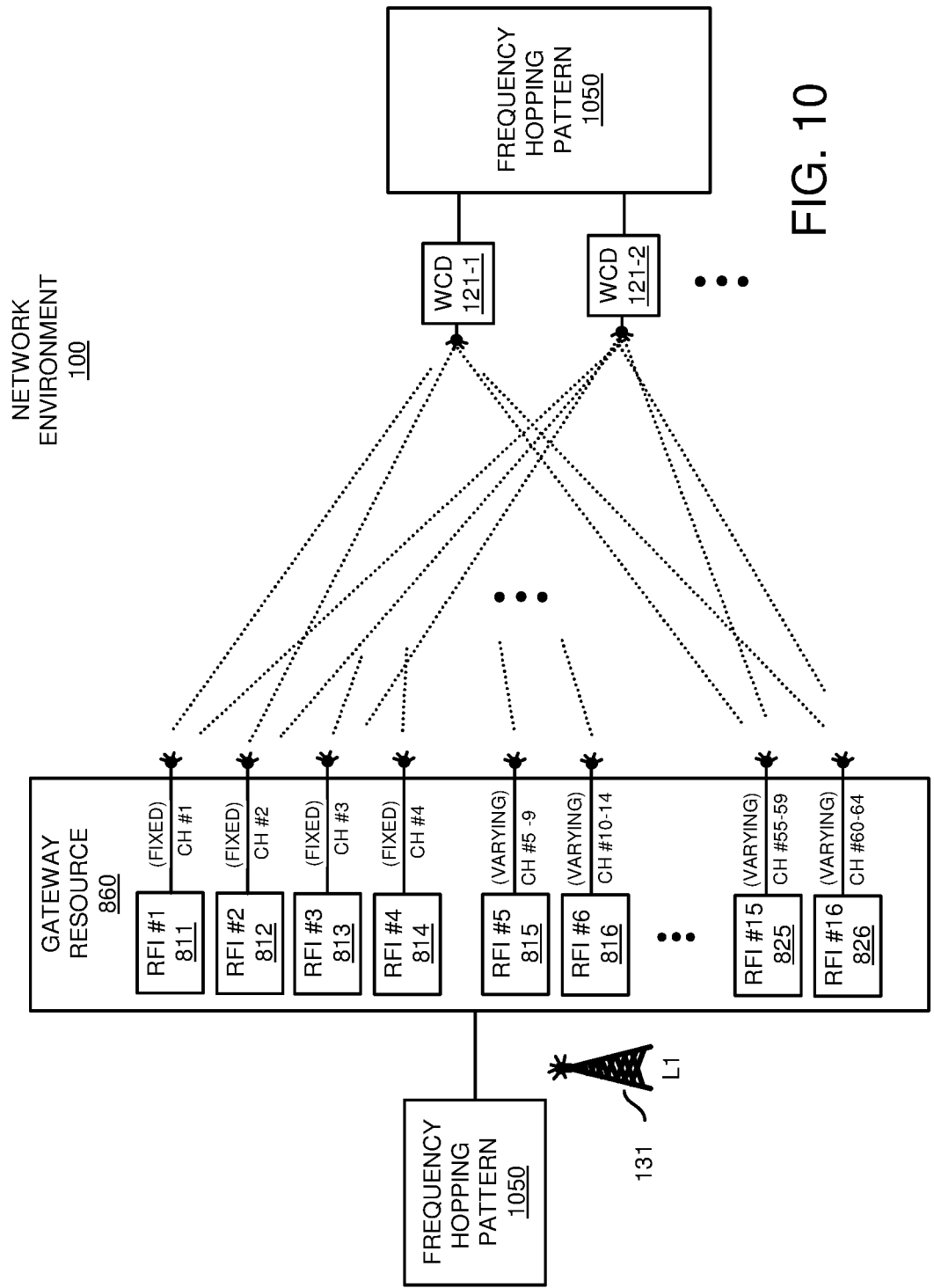
FIG. 10 is an example diagram illustrating a gateway resource supporting fixed and dynamic wireless channel tuning according to embodiments herein.

FIG. 10 is an example diagram illustrating a gateway resource supporting fixed and dynamic wireless channels according to embodiments herein.

Further embodiments herein include initiating frequency hopping using more than a threshold value number of channels. For example, in one embodiment, the gateway hardware receives frequency hopping settings indicating to pseudorandomly hop amongst more than the threshold number of (such as 50 or some other suitable value) different wireless channels including the first wireless channel and the second wireless channel. In one embodiment, the frequency hopping settings are generated such that each of the more than the threshold value number of different channels is selected with equal probability.

Figure 11:
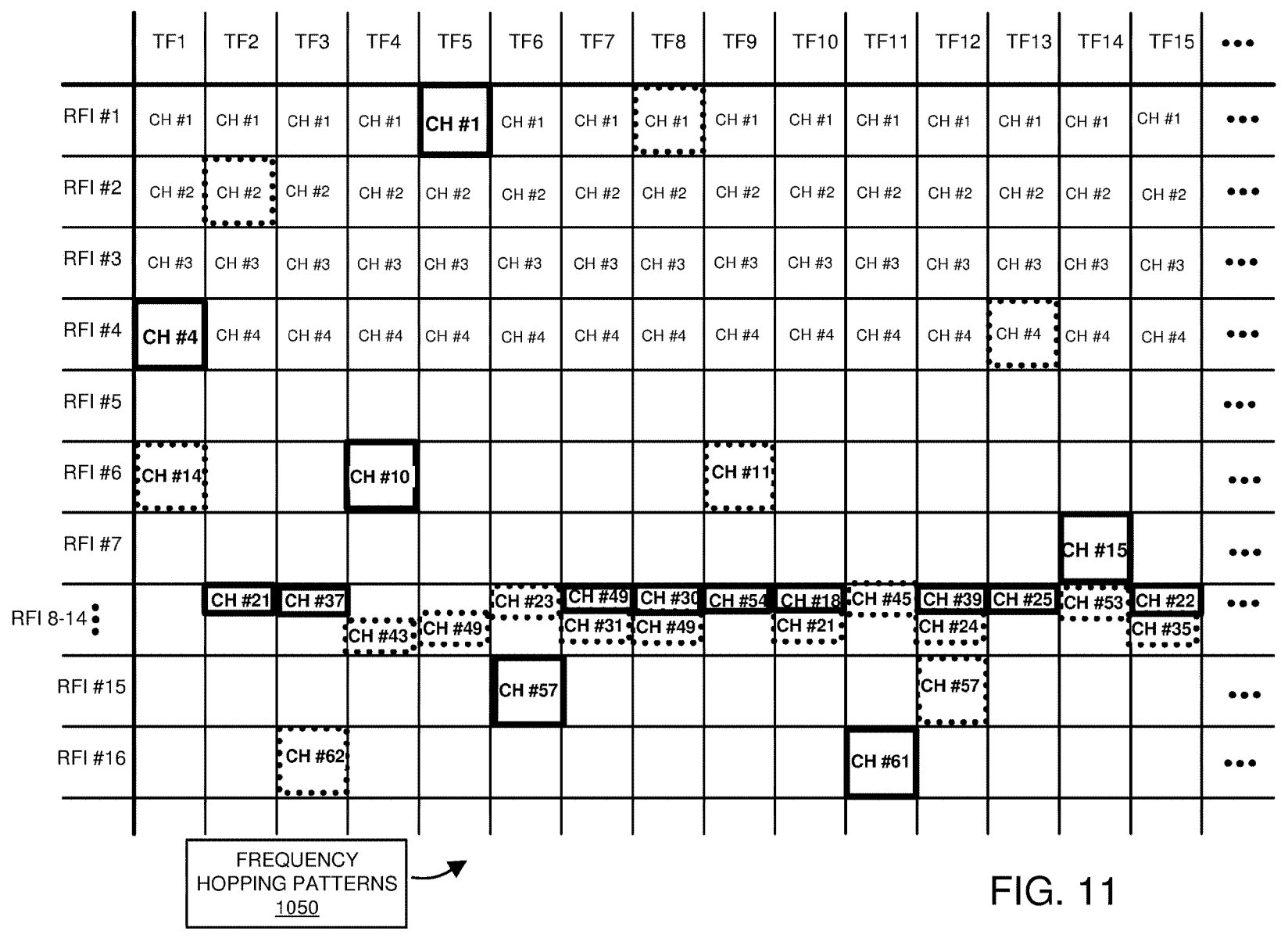

FIG. 11 is an example diagram illustrating frequency hopping settings according to embodiments herein.

In this example embodiment, the gateway resource 141 implements a new frequency hopping pattern 1050 to transmit data to or receive data from one or more wireless communication devices.

In one embodiment, the frequency hopping pattern 1050 in FIG. 11 specifies settings for each of the different radio frequency interfaces in different timeframes to facilitate a different frequency hopping pattern for each of multiple different wireless communication devices. Note again that the timeframes in the frequency hopping pattern 1050 may be spaced apart timewise with respect to each other of follow one after the other without delays in between. Alternatively, timeframes can be skipped to support conveyance of wireless communications in different time slots.

In this embodiment, the frequency hopping pattern 1050 indicates a pattern (bolded squares) used by both (first pair including) the gateway resource 141 and the wireless communication device 121-1 to support communications. For example, assume that the first pair is assigned wireless channel #4 (supported by radio frequency interface #4) during timeframe TF1; the first pair is assigned wireless channel #21 (such as supported by a corresponding dynamically tuned radio frequency interface) during timeframe TF2; the first pair is assigned wireless channel #37 (supported by a dynamically tuned radio frequency interface) during timeframe TF3; the first pair is assigned wireless channel #10 (supported by radio frequency interface #6) during timeframe TF4; the first pair is assigned wireless channel #1 (supported by a corresponding fixed radio frequency interface #1) during timeframe TF5; the first pair is assigned wireless channel #57 (supported by dynamically tuned radio frequency interface #15) during timeframe TF6; the first pair is assigned wireless channel #49 (supported by a corresponding dynamically tuned radio frequency interface) during timeframe TF7; and so on.

Thus, via frequency hopping pattern 1050, the gateway resource 141 can be configured to communicate with wireless communication device 121-1 in accordance with a different frequency hopping pattern (such as greater than 50 different wireless channels) using a different set of radio frequency interfaces 1-16, some of which are tuned to the fixed frequencies (such as radio frequency interface #1-4) and others of which are dynamically tuned to different wireless channels (such as radio frequency interfaces #5-16). In such an instance, the gateway resource and respective wireless communication device communicate at a higher transmit power level.

In this embodiment, the frequency hopping pattern 1050 indicates a pattern (dotted squares) used by both (second pair including) the gateway resource 141 and the wireless communication device 121-2 to support communications. For example, assume that the second pair is assigned wireless channel #14 (supported by radio frequency interface #6) during timeframe TF1; the second pair is assigned wireless channel #2 (such as supported by a corresponding fixedly tuned radio frequency interface) during timeframe TF2; the second pair is assigned wireless channel #62 (supported by a dynamically tuned radio frequency interface #16) during timeframe TF3; the second pair is assigned wireless channel #43 (supported by a respective radio frequency interface) during timeframe TF4; the second pair is assigned wireless channel #49 (supported by a corresponding dynamic radio frequency interface) during timeframe TF5; the second pair is assigned wireless channel #23 (supported by a respective dynamically tuned radio frequency interface) during timeframe TF6; the second pair is assigned wireless channel #31 (supported by a corresponding dynamically tuned radio frequency interface) during timeframe TF7; and so on.

Thus, via frequency hopping pattern 1050, the gateway resource 141 can be configured to communicate with wireless communication device 121-1 in accordance with a different frequency hopping pattern (such as greater than 50 different wireless channels) using a different set of radio frequency interfaces 1-16, some of which are tuned to the fixed frequencies (such as radio frequency interface #1-4) and others of which are dynamically tuned to different wireless channels (such as radio frequency interfaces #5-16). In such an instance, the gateway resource and respective wireless communication device communicate at a higher transmit power level.

In accordance with further embodiments, this fourth variant can be configured to modify the hopping algorithm based on how many gateway resources are collocated. If there are eight collocated 8 channel gateways (64 radio frequency interfaces), the communication management resource system would simply set each of them to a different static channel map and not have to slide (dynamically tune) any of the gateway resources to different wireless channels because each radio frequency interface would support an assigned one of the 64 wireless channels. The full 64 channel lineup would be supported in the coverage area.

Based on number of available radio frequency interfaces in a gateway resource, the communication management resource controls a given deployment and dynamically tunes to an appropriate number of radio frequency interfaces according to needs, and via implementation as previously discussed in the one or more variants above. For example, if a gateway resource includes 48 radio frequency interfaces, the controller could statically cover 40 channels (5 times 8) and assign eight radio frequency interfaces to dynamically tune across the remaining 12 wireless channels. This devolves into the single gateway statically covering all of the wireless channels as discussed above.

Figure 12:
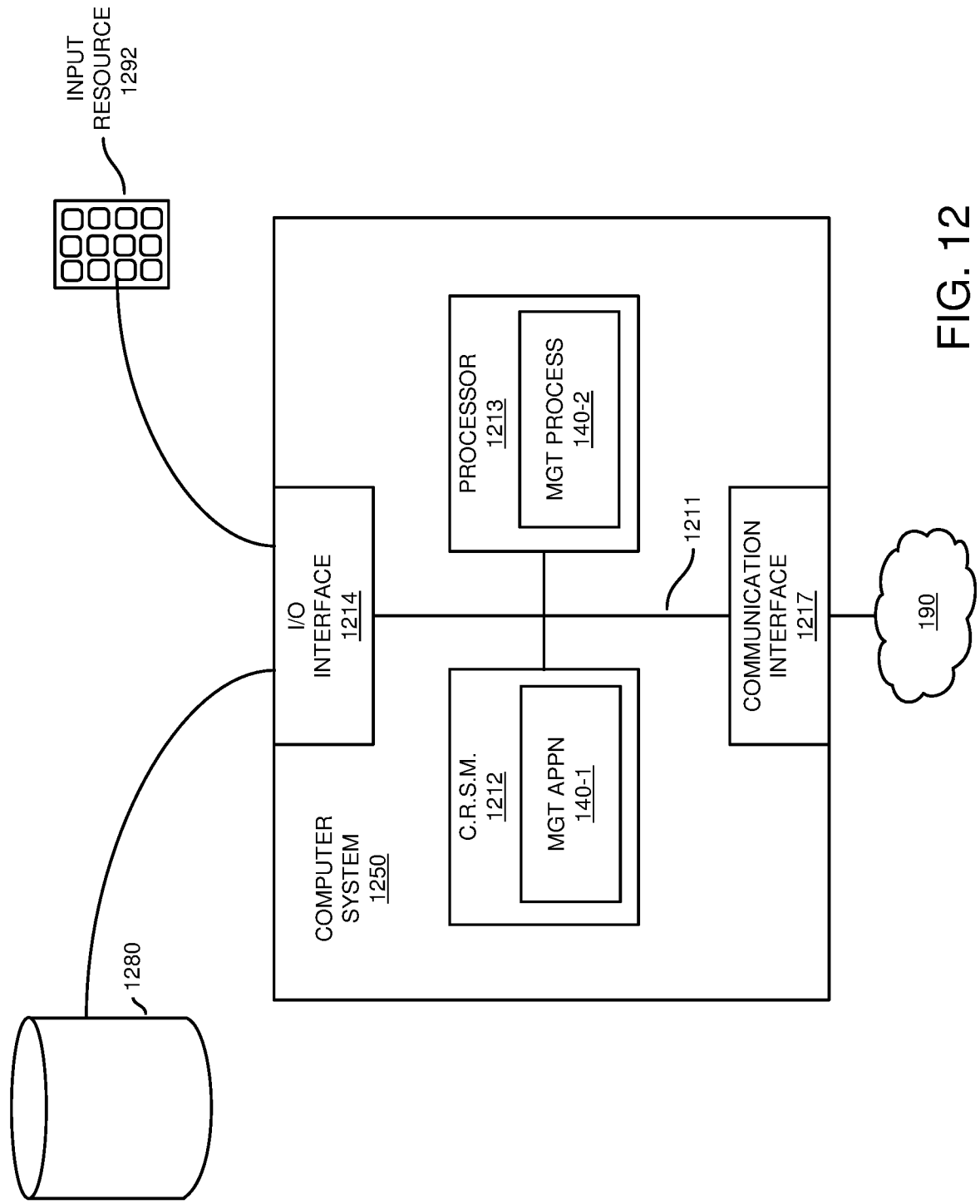
FIG. 12 is an example diagram illustrating example computer architecture operable to execute one or more operations according to embodiments herein.

FIG. 12 is an example block diagram of a computer system for implementing any of the operations as previously discussed according to embodiments herein.

Any of the resources (such as each of one or more wireless communication devices, gateway resources, network server, application servers 160, communication management resource 140, etc.) as discussed herein can be configured to include computer processor hardware and/or corresponding executable (software) instructions to carry out the different operations as discussed herein.

As shown, computer system 1250 of the present example includes an interconnect 1211 coupling computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with management application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in in the management application 140-1 stored on computer readable storage medium 1212. Execution of the management application 140-1 produces management process 140-2 to carry out any of the operations and/or processes as discussed herein.

Those skilled in the art will understand that the computer system 1250 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIGS. 13 and 14. Note that the steps in the flowcharts below can be executed in any suitable order.

Figure 13:
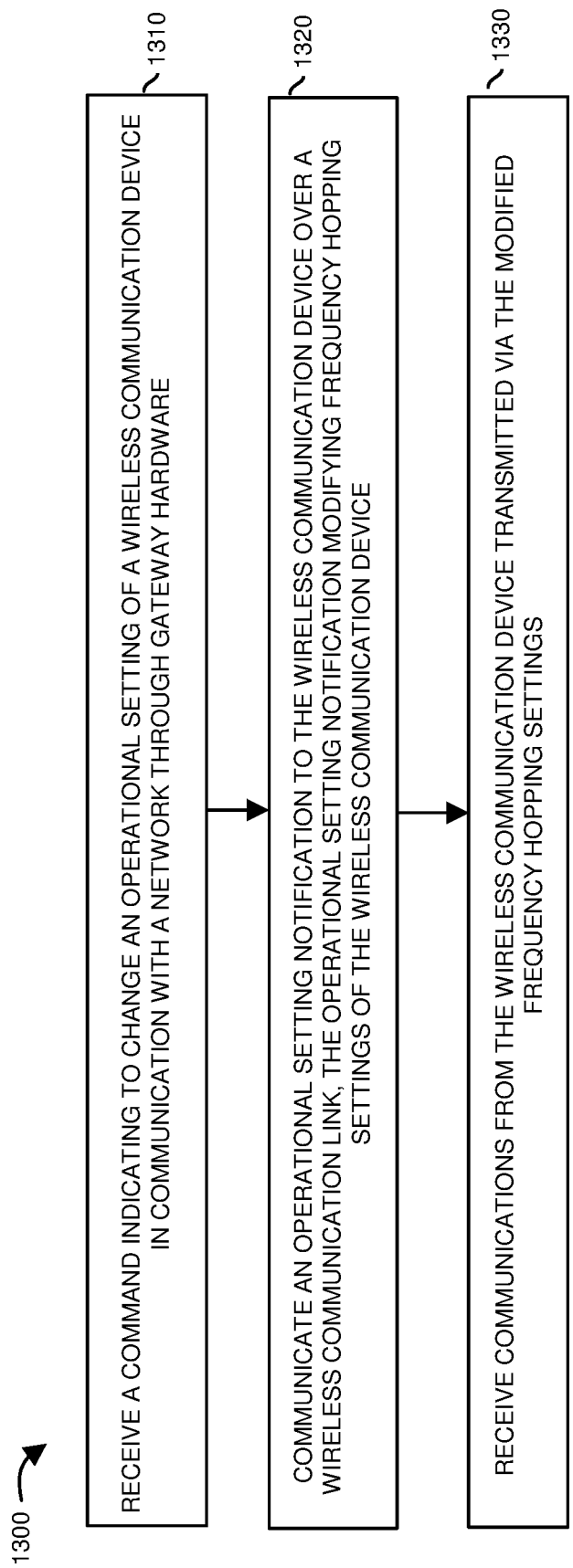
FIG. 13 is an example diagram illustrating a method according to embodiments herein.

FIG. 13 is a flowchart 1300 illustrating an example method according to embodiments herein. Note that there will be some overlap with respect to concepts as discussed above.

In processing operation 1310, the gateway resource 141 (such as hardware and/or software) receives a command indicating to change an operational setting of a wireless communication device 121-1 in communication with a network.

In processing operation 1320, the gateway resource 141 communicates an operational setting notification to the wireless communication device 121-1 over a wireless communication link; the operational setting notification modifies frequency hopping settings of the wireless communication device 121-1.

In processing operation 1330, the gateway resource 141 receives communications from the wireless communication device transmitted via the modified frequency hopping settings.

Figure 14:
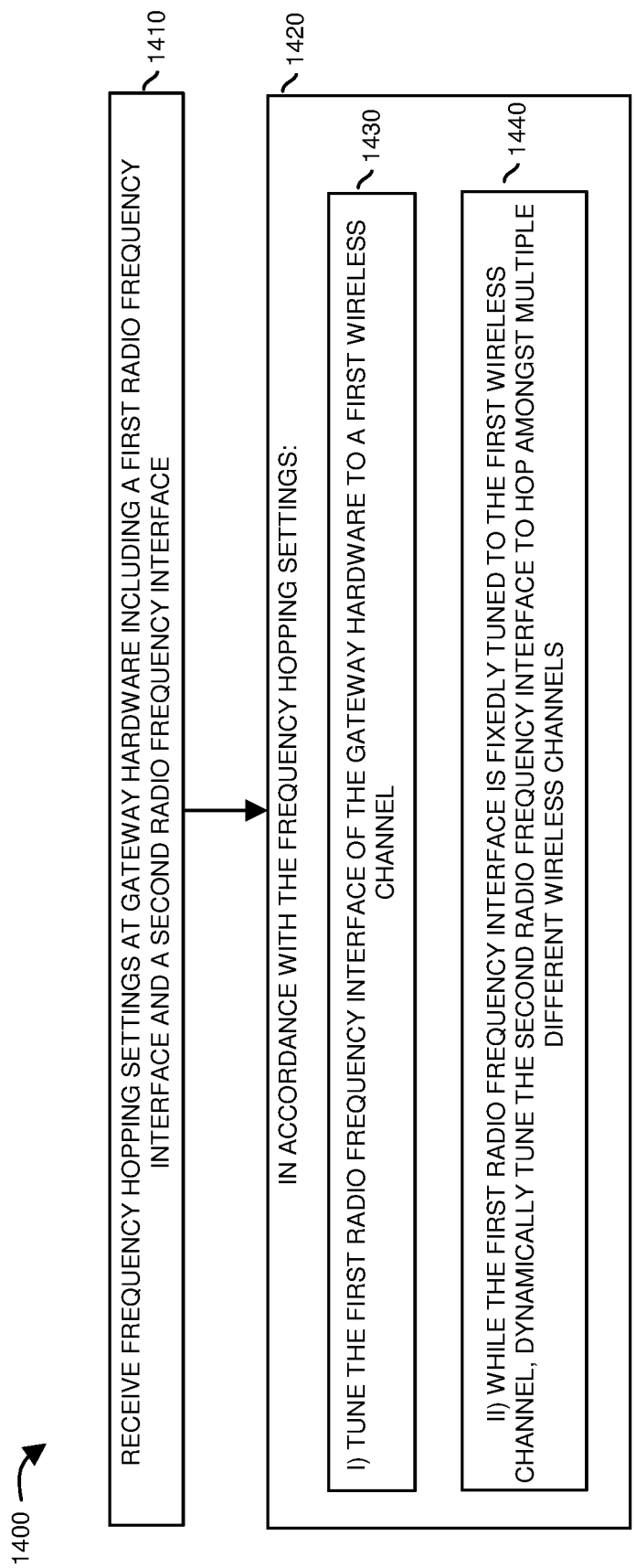
FIG. 14 is an example diagram illustrating a method according to embodiments herein.

FIG. 14 is a flowchart 1400 illustrating an example method according to embodiments herein. Note that there will be some overlap with respect to concepts as discussed above.

In processing operation 1410, the gateway resource 141 receives frequency hopping settings. The gateway resource 141 includes one or more radio frequency interfaces such as a first radio frequency interface 811 and a second radio frequency interface 815.

In processing operation 1420, in accordance with the frequency hopping settings, the gateway resource 141 fixedly tunes the first radio frequency interface 811 of the gateway resource to a first wireless channel (wireless channel #1).

In processing operation 1430, while the first radio frequency interface 811 is fixedly tuned to the first wireless channel (wireless channel #1), in accordance with the frequency hopping settings, the gateway resource 141 dynamically tunes the second radio frequency interface 815 to hop amongst multiple different wireless channels.

Additional Embodiments

Each of the implementations as described herein can be configured to rely on a tuner being able to periodically "hop". If the tuner block has detected one or more packets, it would lose the packet(s) if it hopped at that time. The desired behavior is highly dependent on gateway density and the number of packets per second seen by each gateway. There are a few ways to account for this such as described herein.

In one embodiment, the baseline algorithm starts with each gateway hopping at the same time, using the same frequency band(s). If the gateway sees a preamble, it stays to receive the packet. When the packet(s) complete, it hops to receive on a next wireless channel. Note that this may cause dropped packets on the channels that did not get scanned.

The first level of defense is to have each gateway tune on slightly different channel boundaries. This would decouple some of the sliding behavior, thus leading to fewer instances where two gateways in range of to sensor's near-simultaneous transmissions both the same packet (and missed the other one). This is difficult to reconcile with the previously described fixed mod N maps, and would require discrete channel maps (rather than mod 4 as described previously)

A second level of defense would be to have the gateways under direct control of a cloud based real time controller. Each gateway would inform the cloud of a preamble event, and the cloud would direct each gateway to either stay on the channel or move to the next channel. If the cloud algorithm detects that more than one gateway is likely to receive a given packet (and the likelihood of additional packets being present on the "next" hop), it instructs one or more gateways to hop.

A different approach would be to have a weighting algorithm locally on each gateway. If a single preamble was detected, the gateway would hop 1/X of the time. If 2 preambles were detected, the gateway would hop 1/Z of the time, etc. X and Z would be based on the gateway density and the historical amount of traffic seen by the gateways in the area.

Note again that techniques herein are well suited to facilitate frequency hopping and corresponding communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving a command indicating to change an operational setting of a wireless communication device in communication with a network through gateway hardware, the wireless communication device implementing first frequency hopping settings;
communicating an operational setting notification to the wireless communication device over a wireless communication link, the operational setting notification modifying frequency hopping settings implemented by the wireless communication device, the operational setting notification notifying the wireless communication device to implement second frequency hopping settings in lieu of the first frequency hopping settings, the second frequency hopping settings specifying a different number of channels in which to hop than the first frequency hopping settings; and
receiving communications from the wireless communication device transmitted via the second frequency hopping settings.

2. The method as in claim 1, wherein the operational setting notification specifies a frequency hopping pattern associated with the second frequency hopping settings in which to communicate with the gateway hardware.

3. The method as in claim 1, wherein the second frequency hopping settings as specified by the operational setting notification cause the wireless communication device and the gateway hardware to communicate at a higher RF (Radio Frequency) power level.

4. A method comprising:
receiving a command indicating to change an operational setting of a wireless communication device in communication with a network through gateway hardware;
communicating an operational setting notification to the wireless communication device over a wireless communication link, the operational setting notification modifying frequency hopping settings of the wireless communication device; and
receiving communications from the wireless communication device transmitted via the modified frequency hopping settings;
communicating the operational setting notification to the wireless communication device in accordance with first frequency hopping settings implemented by the gateway hardware and the wireless communication device to communicate with each other, the operational setting notification including second frequency hopping settings; and
subsequent to the communication of the operational setting notification to the wireless communication device, receiving wireless communications at the gateway hardware from the wireless communication device in accordance with the second frequency hopping settings.

5. The method as in claim 4, wherein the second frequency hopping settings support frequency hopping amongst a greater number of wireless channels than the first frequency hopping settings.

6. The method as in claim 5, wherein the second frequency hopping settings as specified by the operational setting notification cause the wireless communication device and the gateway hardware to communicate at a higher RF (Radio Frequency) power level.

7. The method as in claim 1, wherein communicating the operational setting notification to the wireless communication device includes:
transmitting the operational setting notification via application layer provisioning to the wireless communication device.

8. The method as in claim 1, wherein communicating the operational setting notification to the wireless communication device includes:
transmitting the operational setting notification in a data field of a beacon communicated from the gateway hardware to the wireless communication device.

9. The method as in claim 1, wherein receiving the communications from the wireless communication device includes:
at the gateway hardware:
receiving a first portion of the communications from the wireless communication device over a first radio frequency interface tuned to a fixed wireless channel for multiple timeslots; and
receiving a second portion of the communications from the wireless communication device over a second radio frequency interface that is dynamically tuned to a different wireless channel during each of the multiple timeslots; and
wherein the wireless communication device is a first wireless communication device, the method further comprising: at the gateway hardware: receiving communications from a second wireless communication device over the second radio frequency interface of the gateway hardware that is dynamically tuned to a different wireless channel during each of the multiple timeslots.

10. The method as in claim 1, wherein receiving communications from the wireless communication device includes:
receiving a first portion of the communications from the wireless communication device in a first timeslot, the first portion received over a first wireless channel as specified by the second frequency hopping settings; and
receiving a second portion of the communications in a second timeslot, the first timeslot spaced apart from the second timeslot in which no communications are transmitted by the wireless communication device over the first wireless channel, the second portion received over a second wireless channel as specified by the second frequency hopping settings.

11. A method comprising:
receiving a command indicating to change an operational setting of a wireless communication device in communication with a network through gateway hardware;
communicating an operational setting notification to the wireless communication device over a wireless communication link, the operational setting notification modifying frequency hopping settings of the wireless communication device; and
receiving communications from the wireless communication device transmitted via the modified frequency hopping settings;
wherein communicating the operational setting notification to the wireless communication device over the wireless communication link includes:

notifying the wireless communication device to switch to a beacon monitoring mode; and
communicating the frequency hopping settings from the gateway hardware to the wireless communication device in a beacon.

12. A system comprising:
a wireless communication device, the wireless communication device initially implementing first frequency hopping settings; and
gateway hardware operable to:
receive a command indicating to change an operational setting of the wireless communication device;
communicate an operational setting notification to the wireless communication device over a wireless communication link, the operational setting notification modifying frequency hopping settings of the wireless communication device, the operational setting notification specifying second frequency hopping settings in which to communicate with the gateway hardware; and
receive communications from the wireless communication device transmitted via the modified frequency hopping settings.

13. The system as in claim 12, wherein the operational setting notification modifies a number of wireless channels over which the wireless communication device hops during communications with the gateway hardware; and
wherein the gateway hardware is further operable to frequency hop across multiple newly supported wireless channels enabling different wireless communication devices to use the newly supported channels.

14. The system as in claim 12, wherein the frequency hopping settings as specified by the operational setting notification causes each of the wireless communication device and the gateway hardware to communicate with each other at a higher RF (Radio Frequency) power level.

15. A system comprising:
a wireless communication device; and
gateway hardware operable to:
receive a command indicating to change an operational setting of the wireless communication device;
communicate an operational setting notification to the wireless communication device over a wireless communication link, the operational setting notification modifying frequency hopping settings of the wireless communication device; and
receive communications from the wireless communication device transmitted via the modified frequency hopping settings;
wherein the gateway hardware is further operable to:
communicate the operational setting notification to the wireless communication device in accordance with first frequency hopping settings implemented by the gateway hardware and the wireless communication device, the operational setting notification including second frequency hopping settings to be used as a substitute to the first frequency hopping settings; and
subsequent to the communication of the operational setting notification to the wireless communication device, receive wireless communications at the gateway hardware from the wireless communication device in accordance with the second frequency hopping settings.

16. The system as in claim 15, wherein the second frequency hopping settings support frequency hopping amongst a greater number of wireless channels than the first frequency hopping settings.

17. The system as in claim 16, wherein the second frequency hopping settings as specified by the operational setting notification cause the wireless communication device and the gateway hardware to communicate at a higher RF (Radio Frequency) power level.

18. The system as in claim 12, wherein the gateway hardware is further operable to:
transmit the operational setting notification via application layer provisioning to the wireless communication device.

19. The system as in claim 12, wherein the gateway hardware is further operable to:
transmit the operational setting notification in a data field of a beacon from the gateway hardware to the wireless communication device.

20. The system as in claim 12, wherein the gateway hardware is further operable to:
receive a first portion of the communications from the wireless communication device over a first radio frequency interface tuned to a fixed wireless channel for multiple timeslots; and
receive a second portion of the communications from the wireless communication device over a second radio frequency interface that is dynamically tuned to a different wireless channel during each of the multiple timeslots.

21. The system as in claim 12, wherein the gateway hardware is further operable to:
receive a first portion of the communications from the wireless communication device in a first timeslot, the first portion received over a first wireless channel as specified by the modified frequency hopping settings; and
receive a second portion of the communications in a second timeslot different than the first timeslot, the first timeslot spaced apart from the second timeslot in which no communications are transmitted by the wireless communication device in the first wireless channel, the second portion received over a second wireless channel as specified by the modified frequency hopping settings;
wherein available wireless channels of the gateway hardware are multiplied, based on performance needs, many times a number physical radio frequency interfaces of the gateway hardware by way of one or more of the following:
(i) implementing different time slots;
(ii) implementing different RF channels assigned to a same physical radio frequency interface of the gateway hardware;
(iii) all channels hop, at least a portion of radio frequency interfaces of the gateway hardware are set to a fixed frequency;
(iv) wherein the gateway hardware supports any number of wireless channels in different timeslots;
(v) wherein different channels and hopping patterns are supported by the gateway hardware are used by different wireless communication devices in a network.

22. The system as in claim 12, wherein implementation of the second frequency hopping settings by the wireless communication device increases a wireless range in which the wireless communication device is able to communicate.

23. Computer-readable storage hardware having instructions stored thereon, the instructions, when carried out by computer processor hardware, cause the computer processor hardware to:

receive a command indicating to change an operational setting of a wireless communication device in communication with a network through gateway hardware, the wireless communication device implementing first frequency hopping settings;

communicate an operational setting notification to the wireless communication device over a wireless communication link, the operational setting notification modifying frequency hopping settings implemented by the wireless communication device, the operational setting notification notifying the wireless communication device to implement second frequency hopping settings in lieu of the first frequency hopping settings, the second frequency hopping settings specifying a different number of channels in which to hop than the first frequency hopping settings; and receive communications from the wireless communication device transmitted via the second frequency hopping settings.

24. A method comprising:

receiving frequency hopping settings at gateway hardware including a first radio frequency interface and a second radio frequency interface;

in accordance with the frequency hopping settings:
  i) fixedly tuning the first radio frequency interface of the gateway hardware to a first wireless channel; and
  ii) while the first radio frequency interface is fixedly tuned to the first wireless channel, dynamically tuning the second radio frequency interface to hop amongst multiple different wireless channels;
  wherein the frequency hopping settings indicate that the first wireless channel is assigned for use by the first radio frequency interface in a first timeframe in which none of the multiple different wireless channels are assigned for use by the second radio frequency interface; and
  wherein the frequency hopping settings indicate that each of the multiple different wireless channels is assigned for use by the second radio frequency interface in timeframes other than the first timeframe.

25. The method as in claim 24 further comprising:
at the gateway hardware, in accordance with a frequency hopping pattern implemented by both the gateway hardware and a wireless communication device, receiving communications from the wireless communication device over a combination of the first radio frequency interface fixedly tuned to the first wireless channel and the second radio frequency interface dynamically tuned to the multiple different wireless channels.

26. The method as in claim 24 further comprising:
at the gateway hardware, in accordance with a frequency hopping pattern implemented by both the gateway hardware and a wireless communication device, in different timeframes, transmitting communications over the first radio frequency interface fixedly tuned to the first wireless channel and the second radio frequency interface dynamically tuned to the multiple different wireless channels.

27. The method as in claim 24, wherein the first radio frequency interface supports higher quality wireless communications with a wireless communication device than the second radio frequency interface.

28. The method as in claim 24, wherein the received frequency hopping settings indicate to hop amongst more than 50 different wireless channels including the first wireless channel and the second wireless channel; and wherein the frequency hopping settings are generated such that each of the more than 50 different channels is selected with equal probability of use.

29. The method as in claim 24, wherein the gateway hardware prevents tuning of the second radio frequency interface to the first wireless channel assigned to the first radio frequency interface, the method further comprising:

in accordance with the frequency hopping settings:
  tuning a third radio frequency interface of the gateway hardware to a second wireless channel; and
  while the third radio frequency interface is fixedly tuned to the second wireless channel, dynamically tuning a fourth radio frequency interface of the gateway hardware to hop amongst the multiple wireless channels.

30. The method as in claim 1, wherein the first frequency hopping settings indicate a first number of frequency hopping channels to support communications with a particular radio frequency interface of the gateway hardware; and wherein the second frequency hopping settings indicate a second number of frequency hopping channels to support communications with the particular radio frequency interface of the gateway hardware, wherein the second number of frequency hopping channels is greater than the first number of frequency hopping channels.

31. The method as in claim 30, wherein assignment of the first frequency hopping settings limits the wireless communication device to wirelessly transmit a first portion of the communications at a first transmit power level to the gateway hardware; and wherein assignment of the second frequency hopping settings causes the wireless communication device to transmit a second portion of the communications at a second transmit power level to the gateway hardware, the second transmit power level being greater than the first transmit power level.

32. The method as in claim 1, wherein the first frequency hopping settings indicate a first number of frequency hopping channels; and wherein the second frequency hopping settings indicate a second number of frequency hopping channels, the second number of frequency hopping channels greater than the first number of frequency hopping channels.

33. The method as in claim 24, wherein the first wireless channel is selected from a group of available hopping frequencies; and wherein the multiple different wireless channels are isselected from the group of available hopping frequencies, the multiple different wireless channels exclusive of the first wireless channel.

34. A method comprising:

receiving frequency hopping settings at gateway hardware including a first radio frequency interface and a second radio frequency interface;

in accordance with the frequency hopping settings:
  i) fixedly tuning the first radio frequency interface of the gateway hardware to a first wireless channel; and
  ii) while the first radio frequency interface is fixedly tuned to the first wireless channel, dynamically tuning the second radio frequency interface to hop amongst multiple different wireless channels;
  wherein the first wireless channel is selected from a group of available hopping frequencies; and
  wherein the multiple different wireless channels is selected from the group of available hopping frequencies, the multiple different wireless channels exclusive of the first wireless channel;

wherein the frequency hopping settings indicate that the first wireless channel is assigned for use by the first radio frequency interface in a first timeframe in which none of the multiple different wireless channels are assigned for use by the second radio frequency interface; and wherein the frequency hopping settings indicate that each of the multiple different wireless channels is assigned for use by the second radio frequency interface in timeframes other than the first timeframe.

* * * * *